(12) United States Patent
Peña-Mora et al.

(10) Patent No.: US 7,219,122 B1
(45) Date of Patent: May 15, 2007

(54) SOFTWARE SERVICE HANDOFF MECHANISM WITH A PERFORMANCE RELIABILITY IMPROVEMENT MECHANISM (PRIM) FOR A COLLABORATIVE CLIENT-SERVER SYSTEM

(75) Inventors: Feniosky Peña-Mora, Cambridge, MA (US); Sanjeev Vadhavkar, Cambridge, MA (US); Wei Wang, Cambridge, MA (US); Chang Kuang, Foster City, CA (US); Gyanesh Dwivedi, Attleboro, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 586 days.

(21) Appl. No.: 10/128,155

(22) Filed: Apr. 23, 2002

Related U.S. Application Data

(60) Provisional application No. 60/285,861, filed on Apr. 23, 2001, provisional application No. 60/285,797, filed on Apr. 23, 2001.

(51) Int. Cl.
*G06F 15/16* (2006.01)
*G06F 11/00* (2006.01)
(52) U.S. Cl. .......................... 709/201; 714/6
(58) Field of Classification Search ........ 709/201–207; 714/6
See application file for complete search history.

(56) References Cited

U.S. PATENT DOCUMENTS

| 4,788,538 A | | 11/1988 | Klein et al. | |
|---|---|---|---|---|
| 5,313,646 A | * | 5/1994 | Hendricks et al. | .......... 707/101 |
| 5,475,836 A | | 12/1995 | Harris et al. | |
| 5,544,347 A | * | 8/1996 | Yanai et al. | ................. 711/162 |
| 5,557,725 A | | 9/1996 | Ansberry et al. | |
| 5,583,995 A | * | 12/1996 | Gardner et al. | ............. 709/219 |
| 5,721,762 A | * | 2/1998 | Sood | ........................... 455/466 |
| 5,742,792 A | * | 4/1998 | Yanai et al. | ................. 711/162 |
| 5,805,824 A | * | 9/1998 | Kappe | ........................ 709/242 |
| 5,875,186 A | | 2/1999 | Belanger et al. | |
| 5,987,332 A | * | 11/1999 | Gettleman et al. | .......... 455/518 |

(Continued)

FOREIGN PATENT DOCUMENTS

WO     WO 9932974 A1 * 7/1999

OTHER PUBLICATIONS

Vadhavkar, Sanjeev, "Team Interaction Space Effectiveness for Globally Dispersed Teams: Theory and Case Studies", Thesis written for Doctor of Science in Information Technology, Jun. 2001, pp. 1-275.

(Continued)

*Primary Examiner*—Rupal Dharia
*Assistant Examiner*—Philip S. Scuderi
(74) *Attorney, Agent, or Firm*—Daly, Crowley, Mofford & Durkee, LLP

(57) ABSTRACT

A collaborative client-server system having performance reliability improvement (PRIM) includes collaboration techniques for sharing server data among two or more servers, each server coupled to one or more client computers. A communication link between a client computer and a server is handed off to another respective one of the two or more servers under a variety of conditions. Hand off conditions include, congestion of the server processing load, congestion of the communication link between the client computer and the server, and loss of data signal integrity between the client computer and the server.

42 Claims, 10 Drawing Sheets

U.S. PATENT DOCUMENTS

| | | | |
|---|---|---|---|
| 5,996,089 A * | 11/1999 | Mann et al. ..................... 714/6 |
| 6,006,264 A * | 12/1999 | Colby et al. ................. 709/226 |
| 6,011,758 A * | 1/2000 | Dockes et al. ........... 707/104.1 |
| 6,049,820 A | 4/2000 | Murphy, Jr. et al. |
| 6,065,046 A | 5/2000 | Feinberg et al. |
| 6,088,330 A * | 7/2000 | Bruck et al. ................. 370/228 |
| 6,122,754 A * | 9/2000 | Litwin et al. .................... 714/4 |
| 6,219,693 B1 | 4/2001 | Napolitano et al. |
| 6,272,338 B1 | 8/2001 | Modzelesky et al. |
| 6,272,341 B1 | 8/2001 | Threadgill et al. |
| 6,298,370 B1 | 10/2001 | Tang et al. |
| 6,308,284 B1 * | 10/2001 | LeCrone et al. ............... 714/6 |
| 6,314,491 B1 | 11/2001 | Freerksen et al. |
| 6,317,844 B1 * | 11/2001 | Kleiman ........................ 714/6 |
| 6,334,141 B1 * | 12/2001 | Varma et al. ................ 709/205 |
| 6,336,134 B1 * | 1/2002 | Varma ......................... 709/205 |
| 6,389,459 B1 * | 5/2002 | McDowell ................... 709/216 |
| 6,496,942 B1 * | 12/2002 | Schoenthal et al. ............ 714/4 |
| 6,543,001 B2 * | 4/2003 | LeCrone et al. ............... 714/6 |
| 6,567,813 B1 * | 5/2003 | Zhu et al. ................... 707/100 |
| 6,704,839 B2 * | 3/2004 | Butterworth et al. ....... 711/114 |
| 6,826,711 B2 * | 11/2004 | Moulton et al. ............... 714/6 |
| 6,898,642 B2 * | 5/2005 | Chafle et al. ............... 709/248 |
| 2002/0087707 A1 * | 7/2002 | Stewart et al. .............. 709/230 |
| 2003/0009577 A1 * | 1/2003 | Apostolopoulos et al. .. 709/231 |
| 2003/0105829 A1 * | 6/2003 | Hayward .................... 709/214 |
| 2003/0120723 A1 * | 6/2003 | Bright et al. ................ 709/203 |

OTHER PUBLICATIONS

Kuang, Chang, "Multi-Server Collaboration System for Disaster Relief Mission Planning", Thesis written for Master of Science, Jun. 2001, pp. 1-125.

Wang, Wei, "Computer-Supported Virtual Collaborative Learning and Assesment Framework for Distributed Learning Environment", Thesis written for Master of Science, May 2002, pp. 1-171.

Dwivedi, Gyanesh, Hari, "Multiple Device Collaborative and Real Time Analysis System for Project Management in Engineering", Thesis written for Master of Science, May 2001, pp. 1-54.

Internet web page http://www.twincom.com/raid.html, Overview of RAID Levels, pp. 1-4.

* cited by examiner

SOFTWARE SERVICE HANDOFF MECHANISM WITH A PERFORMANCE RELIABILITY IMPROVEMENT MECHANISM (PRIM) FOR A COLLABORATIVE CLIENT-SERVER SYSTEM

CROSS REFERENCE TO RELATED APPLICATIONS

This application claims the benefit under 35 U.S.C. §119(e) of application No. 60/285,861 filed Apr. 23, 2001 and application No. 60/285,797 filed Apr. 23, 2001. Both of these applications are incorporated herein by reference in their entirety.

STATEMENT REGARDING FEDERALLY SPONSORED RESEARCH

This invention was made with government support under Contract No. CMS-987557 awarded by the National Science Foundation. The government has certain rights in this invention.

FIELD OF THE INVENTION

This invention relates to client-server systems having a collaboration and in particular to multi-server client-server systems that share data amongst the multi-servers, and to communication link handoff between clients and servers during a collaboration.

BACKGROUND OF THE INVENTION

Conventional client-server computer systems provide coupling between one or more client computers and a server computer. In such systems, the server computer is provided having server based application programs and a server based storage area that can be used by the one or more client computers. A client computer can access the server based application programs, for example a word processor program, that resides upon the server computer. The client computer can save data, for example a word processor document, to the server based storage area, and can also retrieve the word processor document from the server based storage area.

The client computers coupled to the server can also contain client computer based application programs and a client computer based storage area local to each client computer. A client-server computer system can have both server based and client computers based application programs and storage areas. In general, application programs and storage areas that are used by more than one client computer are provided as server based application programs and server based storage areas. Conversely, application programs and a storage area that are used by one client computer are generally provided as client based application programs and a client based storage area in association with the one client computer.

Conventional client-server systems can be provided having the one or more client computers and the server coupled with a variety of communication links. When the client computers are in close proximity to the server, for example within a few feet or hundreds of feet, the communication links can be direct wire connections, or line-of-sight radio link connections. When the client computers are remote from the server, for example within many miles, the communication links can include telephone wires, cable TV (CATV) wires, Internet backbone, troposphere, and/or satellite links. There is no limitation as to the physical separation between any of the one or more client computers and the server of a client-server computer system when using a combination of the above links.

Conventional client-server computer systems can be provided having the client computers and the server coupled with a variety of electronic communication protocols. For example, TCP/IP is known to be a communication protocol that can send computer information over any of the connections mentioned above. Other protocols, for example Ethernet, can control the distribution of TCP/IP information around a local area network (LAN) of computers.

In one conventional embodiment, the client-server configuration is a single-server configuration in which a single server is connected to the one or more client computers in a star configuration. In a star configuration, the server corresponds to the center of the star and the one or more client computers correspond to the points of the star. In another conventional embodiment, a client computer can access a variety of servers upon manual selection by a client computer user. Each such access selection again provides a star configuration in which the newly selected server corresponds to the center of a new star. With a single-server configuration, it will be recognized that if the single server becomes congested, all of the one or more client computers connected to the single server will suffer slow operation.

Typical client-server systems provide no real time synchronization of data between the one or more client computers, i.e. no "collaboration" between client computers. In contrast, distributed collaboration systems have been provided that can synchronize real time data display and storage between one or more client computers. For example, collaboration systems are provided that can coordinate an interaction in real time between users of multiple client computers, also called a collaboration session, such that each client computer can display the same data and changes to the data that occur during the interaction and each client computer can remain synchronous with the other client computers.

Distributed collaboration systems have been provided by a variety of commercial companies. Manufacturers of software systems include WebEx from WebEx Communications Inc., San Jose, Calif., (www.webex.com), Centra, from Centra Software, Inc., Lexington, Mass., (www.centra.com), PlaceWare from PlaceWare, Inc., Mountain View, Calif., (www.placeware.com), and HelpMeeting from HelpMeeting LLC, Freehold, N.J., (www.helpmeeting.com). It should, however, be recognized that these collaboration systems are still fundamentally single-server systems having star configurations.

Collaboration systems, such as those listed above, have been provided having several servers to serve different collaboration sessions, but throughout a given collaboration session, only one server serves a client computer group. Thus, existing collaboration systems are provided having only the single-server configuration in a star configuration for a given collaboration session.

When a star configuration is used in a collaboration session, data throughput, both in processing speed and in communication link bandwidth, from a single server to all the client computers coupled thereto in the collaboration session, can deteriorate as the quantity of data to be shared becomes greater. In particular, both application software sharing and video broadcasting from a single server require substantial processing speed and communication link bandwidth.

It should be recognized that the client computers, with displays disposed thereupon, can include but are not limited to, desktop computers, laptop computers, personal digital assistants (PDAs), portable telephones, and pagers. Although some of these client computers are computing platforms having low processing speed, when used as client computers in a collaboration session they can depend upon the server for some processing functions. However, single-server architecture may not provide sufficient processing speed for computing platforms that depend upon the server for some processing functions, particularly when then server must service several clients simultaneously.

In one conventional embodiment, the communication links between the variety of computing platforms mentioned above and the server are wireless. Wireless communication links are known to have variable bandwidth, unpredictable data error rates including dropouts, and unpredictable ranges. In particular, in some applications, it may be desirable to provide mobile client computers and mobile servers. Exemplary mobile collaboration sessions include disaster relief collaboration session, for example data sharing during earthquake disaster relief, and military data sharing during military operations. In mobile applications such as these, client computers can be provided as PDAs having wireless communication links to one or more servers, and the one or more servers can also be mobile.

It would therefore be desirable to provide a collaboration system that has greater processing speed and greater communication link bandwidth than a single-server star configuration. It would be further desirable to provide a system that can tolerate variable bandwidth, unpredictable data error rates including dropouts, and unpredictable ranges of mobile client to server communication links yet maintain data integrity. It would be further desirable to provide a system that can tolerate faults in one or more elements of the system without data loss and without data delay.

SUMMARY OF THE INVENTION

In accordance with the present invention, the software service handoff mechanism with a performance reliability improvement mechanism (PRIM) for a collaborative client-server system, hereafter referred to as the system, includes a first collaboration server with which first collaboration server information is stored. The system also includes a second collaboration server with which second collaboration information is stored and also with which a portion of the first collaboration server information is stored. The portion of the first collaboration server information is automatically updated to reflect changes to the first collaboration server information. The portion of the first collaboration server information that is stored in association with the second collaboration server can be either a partial or a complete copy of the first collaboration server information. If is a partial copy, other partial copies can be stored in association with yet other collaboration servers.

With this particular arrangement, the partial copies of the first collaboration server information provide an automatic backup if the first collaboration server or the first collaboration server information becomes unavailable.

In accordance with another aspect of the present invention, the system provides a client computer that can be selectively coupled to one of the first and the second collaboration servers. The selective coupling is automatically determined by the selected collaboration server, based upon a determination of a variety of factors, including the data congestion between the client computer and the selected collaboration server, the processing allocation between the client computer and the selected collaboration server, and the quality of the data link between the client computer and the selected collaboration server, wherein the quality of the data link can be determined, in real time, during and/or before an interaction session.

With this particular arrangement, the coupling between a client computer and selected collaboration server can be handed off to another collaboration server during an interaction session upon determination of the factors listed above. In particular, if a collaboration server becomes unavailable, the client computer with which it is coupled can be handed off to another collaboration server without any delay and without any loss of data.

In accordance with the present invention, the system provides a collaboration method, including storing first collaboration server information in association with a first collaboration server. The method also includes storing second collaboration information in association with a second collaboration server, and also storing a portion of the first collaboration server information in association with the second collaboration server. The method further includes automatically updating the portion of the first collaboration server information to reflect changes to the first collaboration server information. The portion of the first collaboration server information that is stored in association with the second collaboration server can be either a partial or a complete copy of the first collaboration server information. If is a partial copy, other partial copies can be stored in association with yet other collaboration servers.

With this particular arrangement, the partial copies of the first collaboration server information provide an automatic backup if the first collaboration server or the first collaboration server information becomes unavailable.

In accordance with another aspect of the present invention, the system provides a collaboration method, including selectively coupling a client computer to one of the first and the second collaboration servers. The method also includes handing off the selected coupling to the other of the first and the second collaboration servers upon automatic determination of a variety of factors, including the data congestion between the client computer and the selected collaboration server, the processing allocation between the client computer and the selected collaboration server, and the quality of the data link between the client computer and the collaboration server, wherein the handing off is done in real time during an interaction session.

With this particular arrangement, the coupling between a client computer and a collaboration server coupled thereto can be handed off, during an interaction session, to another collaboration server upon determination of the factors listed above. In particular, if a collaboration server becomes unavailable, the client computer with which it is coupled can be handed off to another collaboration server.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Before describing the invention contemplated herein, some introductory concepts and terminology are explained.

A "participant" as used herein refers to a user of the conferencing or collaboration system.

The term "meeting" as used herein refers to individuals coming together for a common purpose.

Similarly, a "session," as used herein, refers to a time and space in which interaction participants come together for a common purpose.

The term "collaboration" as used herein refers to work performed jointly among more than one participant in a meeting, each participant having a client computer for viewing meeting data. Collaboration can be provide, for example, by the system described in U.S. patent application Ser. No. 09/540,947, entitled Collaborative Agent Interaction Control and Synchronization System filed on Mar. 31, 2000, incorporated by reference herein, and assigned to the assignee of the present invention.

The term "synchronous" as used herein refers to events happening, existing, or arising at the same time.

The term "real time," as used herein, will be understood to reflect a time that is small. The term will be further described in association with FIG. 2.

The term "client computer" as used herein refers to processing platforms used by participants, the processing platforms including but not limited to desktop computers, laptop computers, personal digital assistants (PDAs), portable telephones, and pagers.

The term "engine" as used herein refers to a portion of software code that performs a function.

The term "error correction data" as used herein refers generically to a type of data that corresponds to one of a variety of error correction methods, and that is applied to other data for error correction.

Figure 1:
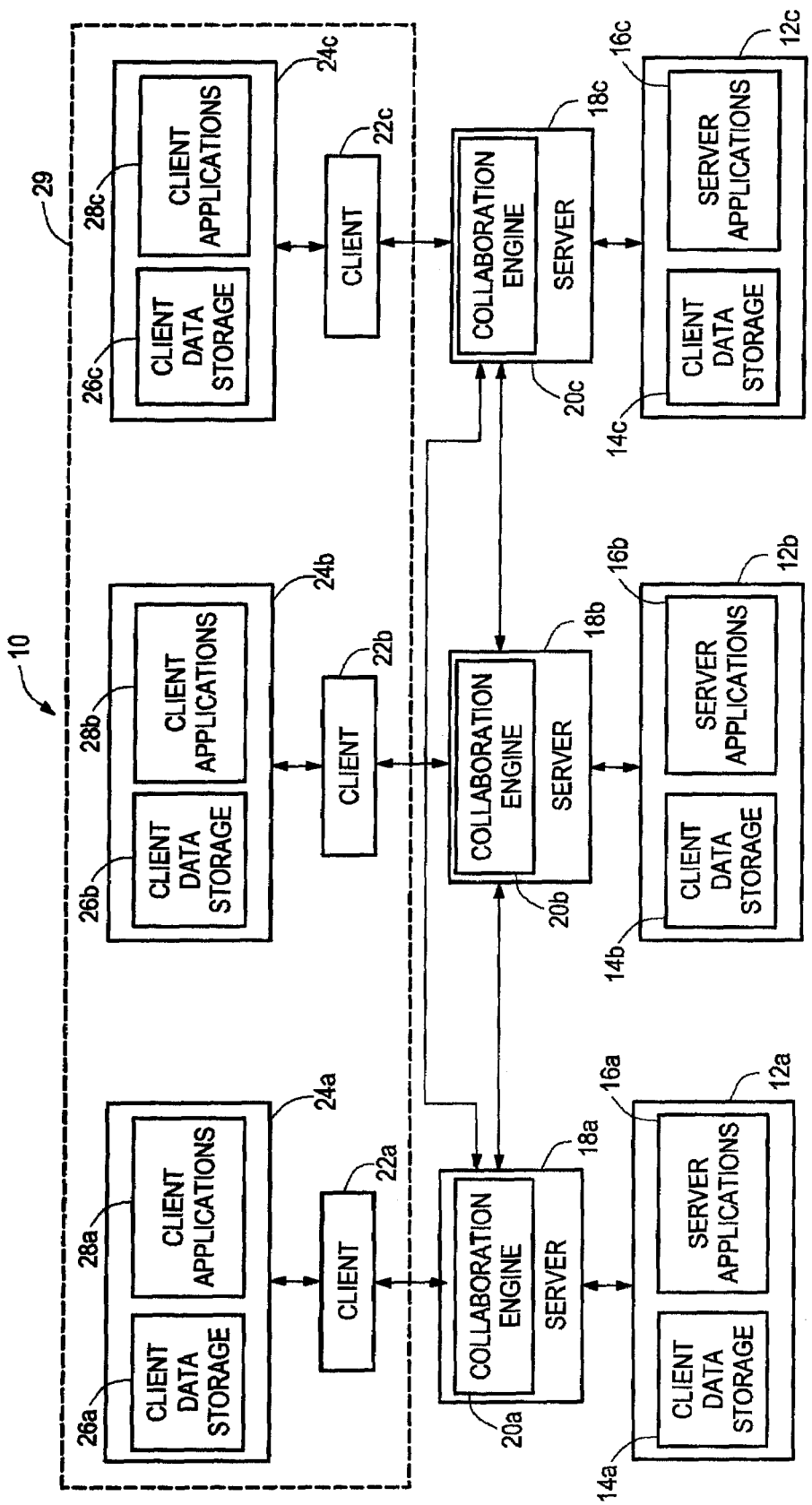
FIG. 1 is a block diagram of an illustrative embodiment of a collaborative client-server system having performance reliability improvement (PRIM) in accordance with this invention.

Referring now to FIG. 1, an illustrative collaborative client-server system 10 includes more than one "server repository," here server repositories 12a–12c, each of which contains a server data storage area 14a–14c and a server application 16a–16c respectively. Each of the server repositories 12a–12c is coupled to a respective server, here server 18a–18c. Each of the servers 18a–18c accesses the respective server repository 12a–12c for volatile and non-volatile data storage in the respective server data storage area 14a–14c. Each of the servers 18a–18c also runs server applications, here server applications 16a–16c respectively. The server data storage areas 14a–14c and the server applications 16a–16c correspond to data and software that runs in a collaboration session.

The respective server data storage areas 14a–14c and the respective server applications 16a–16c correspond to data and application software that resides in a memory local to a respective server 18a–18c. However, it will become apparent from the discussion below that, in a collaboration session, the servers 18a–18c communicate a respective server data storage area 14a–14c and respective server applications 16a–16c to others of the servers 18a–18c. Thus, the respective server data storage area 14a–14c and the respective server applications 16a–16c are associated with others of the servers 18a–18c by the collaboration engines 20a–20c.

The coupling between each of the server repositories 12a–12c and the respective server 18a–18c can be provided in a variety of ways. In one embodiment, each of the server repositories 12a–12c can be within the respective server 18a–18c, and the coupling can be provided by a standard electronic bus, for example a PCI bus or a SCSI bus. In an alternate embodiment, each of the server repositories 12a–12c is not within the respective server 18a–18c, but is still locally related to the respective server 18a–18c, and the coupling is provided, for example, as an Ethernet bus. It will be recognized that the coupling between each of the server repositories 12a–12c and the respective server 18a–18c can be provided in a variety of ways.

Each of the servers 18a–18c is provided having a collaboration engine, here respective collaboration engine 20a–20c respectively. Each of the collaboration engines 20a–20c can be provided as a separate element coupled to the respective server 18a–18c. In an alternate embodiment, each of the collaboration engines 20a–20c can be provided as an integral element of the respective server 18a–18c. For example, each of the collaboration engines 20a–20c is provided as a software module integral to the respective server 18a–18c. Each of the collaboration engines 20a–20c allows the respective server 18a–18c to share information corresponding to its respective server repository 12a–12c, including information corresponding to its respective server storage data storage area 14a–14c and to its respective server application 16a–16c. For example, servers 18a–18c can each access the data corresponding to the server repository 12a, the server repository 12b, and the server repository 12c. In further discussion below, it will be assumed that each of the servers 18a–18c is provided having a respective integral collaboration engine 20a–20c.

Where more than one server can access, and potentially modify, data associated with each other server, rules are used to determine which server can modify the data. For example, such rules can be of a type described in U.S. patent application Ser. No. 09/540,947, entitled Collaborative Agent Interaction Control and Synchronization System filed on Mar. 31, 2000, mentioned above.

The coupling among servers 18a–18c can be provided such that each server 18a–18c is coupled to each other server 18a–18c as shown. In an alternate embodiment, the coupling among the servers 18a–18c can be provided such that server 18a is coupled to server 18b and the server 18b is coupled to the server 18c and no direct coupling is provided between the server 18a and the server 18c.

The servers 18a–18c can be coupled in a variety of ways. Where the servers 18a–18c are locally related to each other, the coupling can be provided, for example, with an Ethernet bus, using the TCP/IP protocol. Where the servers are distant from each other, the coupling can be provided, for example, via the Internet having TCP/IP protocol. It will be recognized that coupling to the internet can be provided in a variety of ways, including the public switched telephone network (PSTN) and a variety of wireless radio frequency (RF) links, including line-of-sight and satellite links.

Each server 18a–18c is coupled to zero or more respective client computers, here each server 18a–18c is coupled to a respective client computer 24a–24c. For example, server 18a can be coupled to one client computer 22a. The utility of a coupling to zero client computers will be understood in association with FIGS. 2–6. Let it suffice here to say that a server 18a–18c, without a coupling to a respective client computer 22a–22c, can be provided for data redundancy only. It should be understood that, where more than one client computer are coupled to a server, for example sever 18a, the server data storage area, for example the server data storage area 14a, and the server applications, for example the server application 16a, are each associated with the more than one client computer. Thus, each of the storage areas 14a–14c can contain data associated with a plurality of client computers.

The coupling between each of the server 18a–18c and the respective client computer 22a–22c can be provided in a variety of ways, including, for example, Ethernet where locally related, and Internet where not locally related, including PSTN and RF links.

Each of the client computers 22a–22c is coupled to a respective client computer repository 24a–24c that provides a respective client computer data storage area 26a–26c and respective client computer applications 28a–28c. Each of the client computers 22a–22c can access the respective client computer repository 24a–24c for volatile and non-volatile data storage associated with the respective client computer data storage area 26a–26c. Each of the client computers 22a–22c can also run software programs that perform respective client computer applications 28a–28c. In one exemplary embodiment, each of the client computer repositories 24a–24c corresponds to each respective client computer 22a–22c.

As described above, though collaboration, the servers 18a–18c communicate the respective server data storage areas 14a–14c and the respective server applications 16a–16c to others of the servers 18a–18c. Thus, it will be apparent that a client computer, for example the client computer 22a, can communicate with one or more of the server data storage areas 14a–14c and one or more of the server applications 16a–16c, wherein the one or more server data storage areas 14a–14c and the one or more server applications 16a–16c are associated with a collaboration session. Thus, in one embodiment, each of the client computers 22a–22c can collaborate in one software application associated with one server, for example, a software application corresponding to the server applications 16a, associated with the server 18a. The collaboration is indicated by a phantom border 29. For example, users of each of the client computers 22a–22c can run a computer aided design (CAD) program, wherein the CAD program corresponds to a server application 16a. However, through collaboration provided by the collaboration engines 20a–20c, each of the client computers 22a–22c can display the same view to the users of each of the client computers 22a–22c. Users of the client computers 22a–22c can take part in a collaboration session using the CAD program. In this example, each of the servers 18a–18c and each of the client computers 22a–22c collaborate in the CAD program, wherein the CAD program corresponds to the server applications 16a. It will also become apparent from discussion associated with FIGS. 5 and 6 that a software application, for example the CAD program, associated with the one server can be handed off to another server having a corresponding software application.

The coupling between each of the client computers 22a–22c and the respective client computer repository 24a–24c can be provided in a variety of ways similar to those described above for the coupling between each of the servers 18a–18c and the respective server repository 12a–12c. In one exemplary embodiment each of the client computer repositories 24a–24c are within the respective client computer 22a–22c and the coupling is provided by a PCI bus.

The client computers 22a–22c can be provided, for example, as desktop computers, laptop computers, personal digital assistants (PDAs), portable telephones, and pagers, or any combination thereof. As some of these client computers are computing platforms having relatively low processing speed, it is desirable that, in some instances, the processing that would normally be done in each of the client computers 22a–22c, can be re-allocated to the respective server 18a–18c. Such re-allocation of processing functions can be provided by the collaboration engines 20a–20c. Information that describes the type of client computer, for example information that describes a PDA, can be provided by the client computer. For example client computer 22a can provide identifying information to the respective server 18a, and the respective collaboration engine 20a can receive the information and adjust the processing allocation between the client 22a and the server 18a accordingly.

Figure 2:
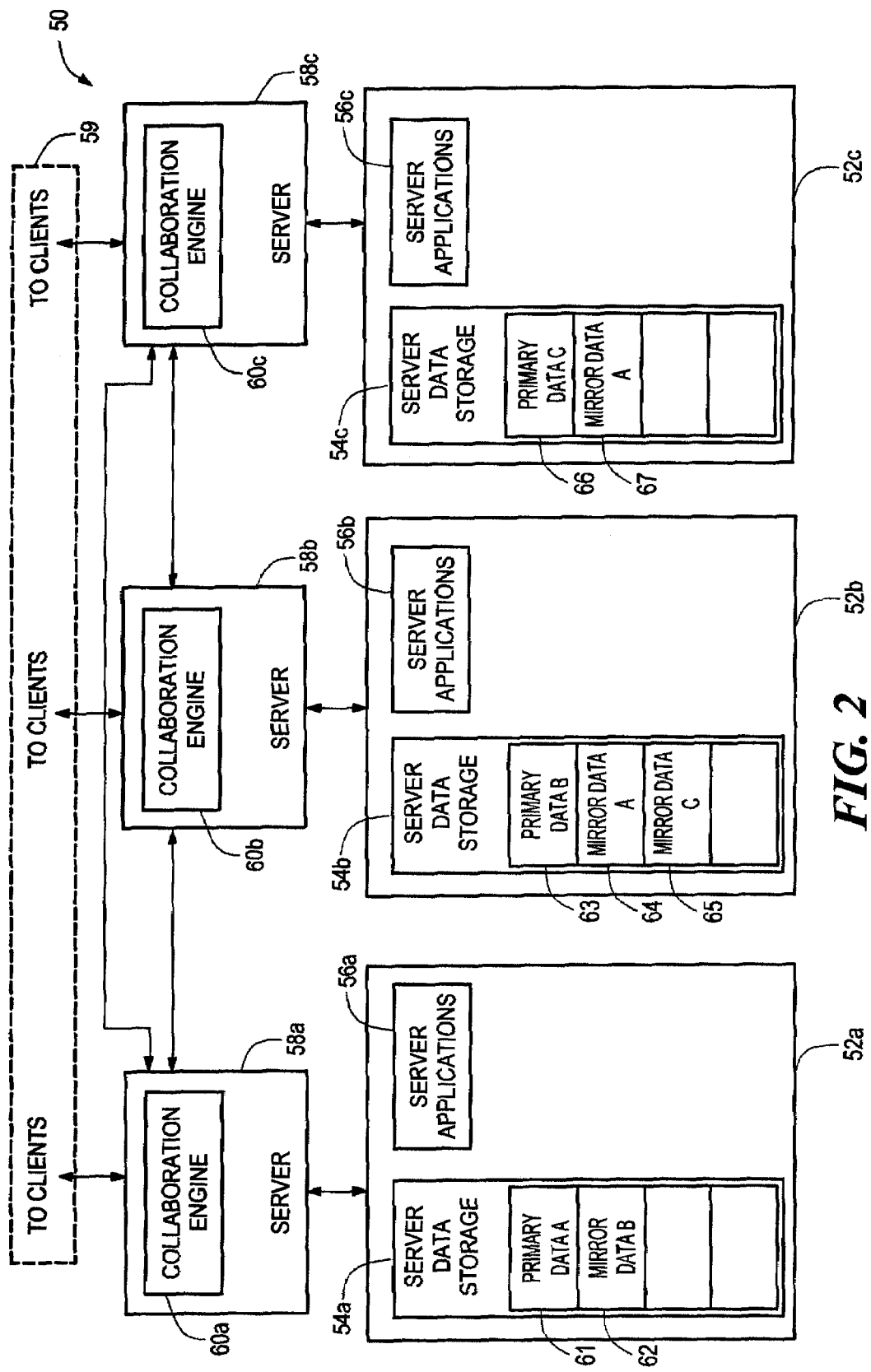
FIG. 2 is a block diagram having further detail of FIG. 1, showing an illustrative embodiment of PRIM in accordance with this invention.

Referring now to FIG. 2, an illustrative example of a multi-server collaborative client-server system 50 includes server repositories, here server repositories 52a–52c, each of which is coupled to a respective server 58a–58c. Each of the server repositories 52a–52c includes a respective server data storage area 54a–54c and respective server applications 56a–56c. Each of the servers 58a–58c contains a respective collaboration engine 60a–60c. The servers 58a–58c can be provided as the type of servers 18a–18c shown in FIG. 1. The server repositories 52a–52c can be provided as the type of server repositories 12a–12c shown in FIG. 1. The server data storage areas 54a–54c can be provided as the type of server data storage areas 14a–14c shown in FIG. 1. Here, however, the server data storage areas 52a–52c are shown in greater detail.

Again, as described above, though collaboration, the servers 58a–58c communicate the respective server data storage areas 54a–54c and the respective server applications 56a–56c to others of the servers 58a–58c. Thus, a client computer (not shown) can communicate with one or more of the server data storage areas 54a–54c and one or more of the server applications 56a–56c, wherein the one or more server data storage areas 54a–54c and the one or more server applications 56a–56c are associated with a collaboration session. The collaboration is indicated by a phantom border 59.

The server data storage area 54a includes primary data A 61 corresponding to the server 58a. The primary data A 61 is generated and provided in association with the server applications 56a. It should be understood that, as described above, where more than one client computer are coupled to one server, for example server 58a, the primary data A 61 can correspond to the more than one client computer.

The server data storage area 54a can also include mirror data B 62. The mirror data B 62 corresponds to the server 58b. It should be understood that the mirror data B 62 is provided as a copy of primary data B 63. It will become apparent from discussion below that this figure corresponds to but one arrangement with which data can be protected against data loss during a collaboration session, wherein the data loss can otherwise occur in a hostile or unstable environment.

The server data storage area 54b includes primary data B 63. The primary data B 63 is generated and provided in association with the server applications 56b. As described above with regard to primary data A 61, the primary data B 63 can correspond to more than one client computer coupled to the server 58b.

The data storage area 54b can also include mirror data A 64. The mirror data A 64 corresponds to a copy of the primary data A 61 described above. The primary data A 61 within the server repository 52a is provided to the server 58a, thereupon to the collaboration engine 60a, thereupon to the collaboration engine 60b, thereupon to the server 58b, thereupon to the server repository 52b, and thereupon to the server data storage area 54b to provide the mirror data A 64. Thus, the collaboration engines 60a, 60b provide a data transfer that automatically creates a mirror copy of primary data associated with one server within the server data storage area of another server.

Similarly, the primary data B 63 within the server repository 52b is provided to the server 58b, thereupon to the collaboration engine 60b, thereupon to the collaboration engine 60a, thereupon to the server 58a, thereupon to the server repository 52a, and thereupon to the server data storage area 54a to provide the mirror data B 62 that is a copy of the primary data B 63.

The data storage 54b can also include mirror data C 65. The mirror data C 65 corresponds to the server 58c. It should understood that the mirror data C 65 is provided as a copy of primary data C 66, further described below.

The data storage area 54c contains data including primary data C 66. The primary data C 66 is generated and provided in association with the server applications 56c. As described above with regard to primary data A 61, the primary data C 66 can correspond to more than one client computer coupled to the server 58c. The primary data C 66 within the server repository 52c is provided to the server 58c, thereupon to the collaboration engine 60c, thereupon to the collaboration engine 60b, thereupon to the server 58b, thereupon to the server repository 52b, and thereupon to the server data storage area 54b to provide the mirror data C 65.

While primary data A 61, primary data B 63, and primary data C 66 are shown and described to be associated with the respective mirror data A 64, mirror data B 62, and mirror data C 65, it should be recognized that any number of mirror data copies can be generated with this invention. In an alternate embodiment, mirror data copies of each of the primary data, for example primary data A 61, can be generated in more than one server data storage area, for example in both data storage area 52b, as mirror data A 64, and data storage area 52c, as mirror data A 67. In this way, it is possible to have all primary data mirrored to all server data storage areas, and all servers, for example servers 58a–58c, can have direct access to identical and complete data.

It should be recognized that the collaboration engines 60a–60c can provide and alter the mirror data, for example mirror data A 64, mirror data B 62, and mirror data C 65, in real time as the corresponding primary data, for example primary data A 61, primary data B 63, and primary data C 66 are provided and changed by the variety of clients (not shown) that are coupled to the servers 58a–58c.

It should also be recognized that if primary data is lost, for example if the primary data A 61 is lost, then a mirror data, for example the mirror data A 64 or the mirror data A 67, can be re-allocated as a new primary data A.

The term "real time," as used herein, will be understood to reflect a time that is generally small. For example, in the example above, the mirror data A 64, mirror data B 62, and mirror data C 65 are updated in real time, upon a change of the corresponding primary data. Thus, the update occurs automatically at some small time after a change in the corresponding primary data. The real time can correspond, for example, to the time that it takes a collaboration server to complete a software thread that it is processing. Alternatively, the real time can correspond to the time that it takes a collaboration connection to be established between collaboration engines. It should be understood that the collaboration connection can be temporarily unavailable, due to connection failure, data congestion of the like. However, the update can be queued with other updates so that the update will occur in sequence when the connection is re-established. The term real time, as used herein, reflects a small time, wherein the small time can be extended due to collaboration connection delays.

Each of the collaboration engines 60a–60c allows the respective server 58a–58c to share information corresponding to its respective server repository 52a–52c, including information corresponding to its respective server data storage area 54a–54c and to its respective server application 56a–56c. For example, the servers 58a–58c can each access the primary data A 61, the primary data B 63 and the primary data C 66, and each of the servers 58a–58c can access the mirror data B 62, the mirror data A 64, the mirror data C 65, and the mirror data A 67, and each of the servers 58a–58c can access each of the server applications 56a–56c. In further discussion below, it will be assumed that each of the servers 58a–58c is provided having the respective integral collaboration engine 60a–60c.

In general, the mirror data B 62, mirror data A 64, mirror data C 65, and mirror data A 67 are provided as backup to the corresponding primary data A 61, primary data B 63, and primary data C 66. With this particular arrangement, all servers have access to particular data. For example, servers 58a–58c have access to primary data A 61 and servers 58a–58c have access to mirror data A 64 that is a copy of primary data A 61. Here, if any one of the servers 78a–78c lose communication, malfunction, or otherwise become damaged, all data corresponding to the primary data A 61 can be accessed by another server. If, for example, the server 58a malfunctions, causing a loss of the server repository 52a having the primary data A 61, the server 58b and the server 58c can each access corresponding data as mirror data A 64 or as mirror data A 67. Either of the mirror data A 64 or the mirror data A 67 can then be re-allocated to be a new primary data A. In another example, if the server 58a is taken out of service by a power outage or by a military attack, causing the loss of the server repository 52a having the primary data A 61, again the server 58b and the server 58c can each access corresponding data as mirror data A 64 or as mirror data A 67.

As described above, where more than one server can access, and potentially modify, data associated with other servers, rules are used to determine which server can modify the data. For example, collaboration rules can be of a type described in U.S. patent application Ser. No. 09/540,947, entitled Collaborative Agent Interaction Control and Synchronization System filed on Mar. 31, 2000, mentioned above.

Respective ones of the more than one client computer coupled to a server can depend upon the server for some processing functions. Essentially, functions that would otherwise be performed by the client computers, for example client computer 22*a* of FIG. 1, and the client computer repository, for example client computer repository 24*a* of FIG. 1, can be re-allocated to the server for example server 18*a* of FIG. 1 corresponding to the server 58*a*, and the server repository 52*a*. Each of the collaboration engines, for example collaboration engine 60*a*, can receive information from the clients (not shown) to which it is coupled, for example information about the type of processing platform, and can also receive information from the server 58*a* about the loading, i.e. the amount of processing, ongoing within the server 58*a*. With this information, the collaboration engine, for example collaboration engine 60*a*, can generate an allocation of processing load between the clients (not shown) and the server 58*a*.

Thus, the collaboration engines 60*a*–60*c* can provide at least two functions. Each of the collaboration engines 60*a*–60*c* can generate mirror data to one or more server data storage areas 54*a*–54*c* and they can allocate processing among clients (not shown) and respective servers 58*a*–58*c*. Both of these functions correspond to a performance reliability improvement (PRIM) for reasons to be further explained below.

Figure 3:
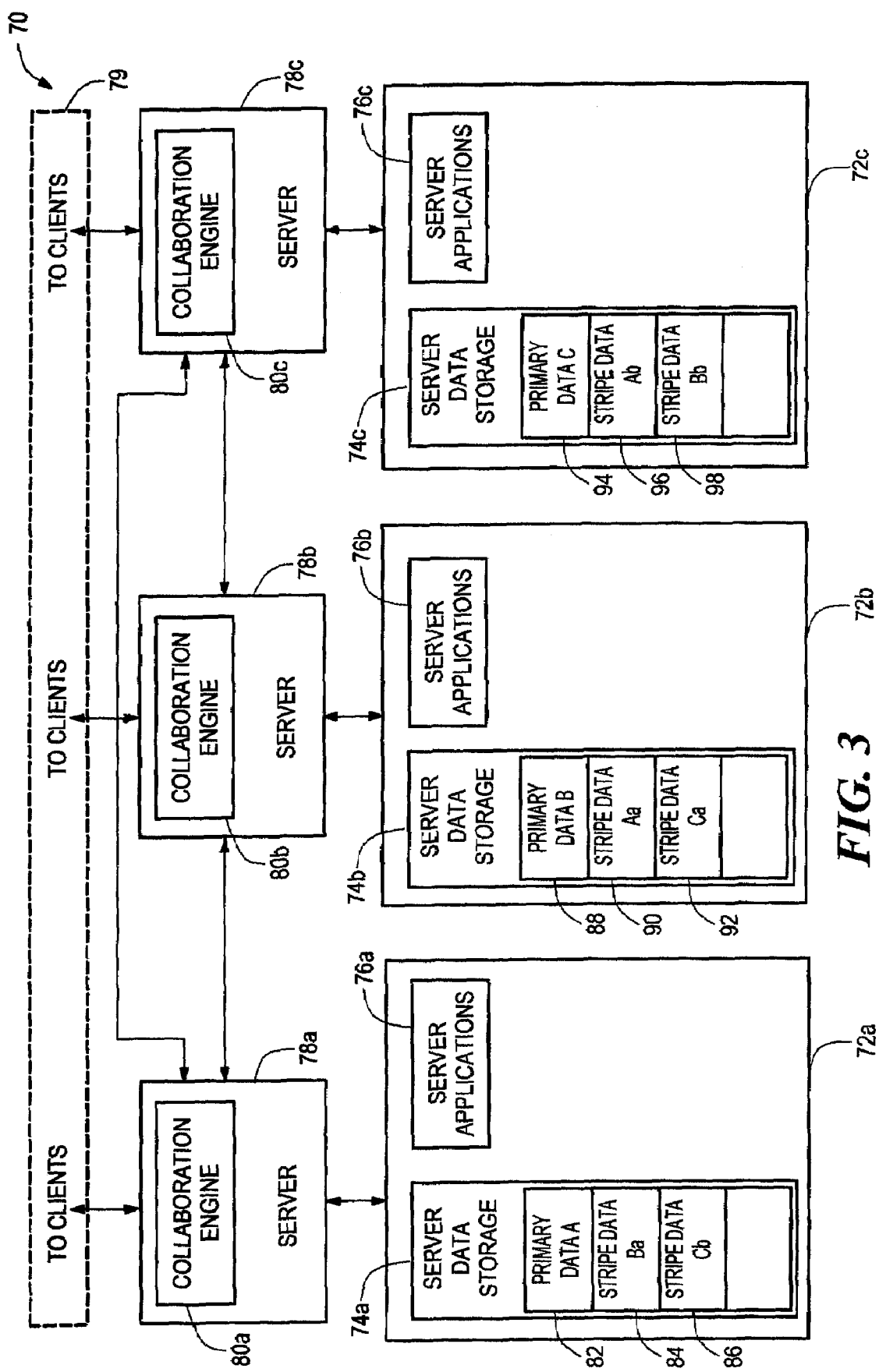
FIG. 3 is a block diagram showing further detail of FIG. 1, showing another illustrative embodiment of PRIM in accordance with this invention.

Referring now to FIG. 3, another illustrative example of a multi-server collaborative client-server system 70 includes server repositories, here server repositories 72*a*–72*c*, each of which is coupled to a respective server 78*a*–78*c*. Each of the server repositories 72*a*–72*c* includes a respective server data storage area 74*a*–74*c* and respective server applications 76*a*–76*c*. Each of the servers 78*a*–78*c* contains a respective collaboration engine 80*a*–80*c*. The servers 78*a*–78*c* can be provided as the type of servers 18*a*–18*c* shown in FIG. 1. The server repositories 72*a*–72*c* can be provided as the type of server repositories 12*a*–12*c* shown in FIG. 1. Server data storage areas 74*a*–74*c* can also be provided as the type of server repositories 14*a*–14*c* shown in FIG. 1. Here, however, the server data storage areas 72*a*–72*c* are shown in greater detail. Server applications 76*a*–76*c* can also be provided as the type of server applications 16*a*–16*b* shown in FIG. 1.

Again, as described above, though collaboration, the servers 78*a*–78*c* communicate the respective server data storage areas 74*a*–74*c* and the respective server applications 76*a*–76*c* to others of the servers 78*a*–78*c*. Thus, a client computer (not shown) can communicate with one or more of the server data storage areas 74*a*–74*c* and one or more of the server applications 76*a*–76*c*, wherein the one or more server data storage areas 74*a*–74*c* and the one or more server applications 76*a*–76*c* are associated with a collaboration session. The collaboration is indicated by a phantom border 79.

In this embodiment, the server data storage area 74*a* includes primary data A 82, stripe data Ba 84, and stripe data Cb 86. The primary data A 82 corresponds to the server 78*a*. The primary data A 82 is generated and provided in association with the server applications 76*a*. It should be understood that, as described above, where more than one client computer are coupled to one server, for example, server 78*a*, the primary data A 82 can correspond to the more than one client computer.

The data storage area 74*a* can also include stripe data Ba 84. The stripe data Ba 84 corresponds to the server 78*b*. It should understood that the stripe data Ba 84 is provided as a first partial copy of primary data B 88, further described below. The data storage area 74*a* can also include stripe data Cb 86. It should be understood that stripe data Cb 86 is provided as a second partial copy of primary data C 94, also further described below.

The data storage area 74*b* includes primary data B 88. The primary data B 88 is generated and provided in association with the server applications 76*b*. As described above with regard to the primary data A 82, the primary data B 88 can correspond to more than one client computer coupled to the server 78*b*.

The data storage area 74*b* can also include stripe data Aa 90. The stripe data Aa 90 corresponds to a first partial copy of the primary data A 82 described above. A first portion of the primary data A 82 within the server repository 72*a* is provided to the server 78*a*, thereupon to the collaboration engine 80*a*, thereupon to the collaboration engine 80*b*, thereupon to the server 78*b*, thereupon to the server repository 72*b*, and thereupon to the server data storage area 74*b* to provide the stripe data Aa 90 that is a first partial copy of the primary data A 82. A second portion of the primary data A 82 within the server repository 72*a* is also provided to the server 78*a*, thereupon to the collaboration engine 80*a*, thereupon to the collaboration engine 80*c*, thereupon to the server 78*c*, thereupon to the server repository 72*c*, and thereupon to the server data storage area 74*c* to provide stripe data Ab 96 that is a second partial copy of the primary data A 82. The stripe data Aa 90 in combination with the stripe data Ab 96 provide a complete copy of the primary data A 82. Thus, the collaboration engines 80*a*–80*c* provide a data transfer that automatically creates stripe copies of primary data associated with one server within the server data storage area of other servers.

Similarly, a first portion of the primary data B 88 within the server repository 72*b* is provided to the server 78*b*, thereupon to the collaboration engine 80*b*, thereupon to the collaboration engine 80*a*, thereupon to the server 78*a*, thereupon to the server repository 72*a*, and thereupon to the server data storage area 74*a* to provide the stripe data Ba 84 that is a first partial copy of the primary data B 88. A second portion of the primary data B 88 within the server repository 72*b* is also provided to the server 78*b*, thereupon to the collaboration engine 80*b*, thereupon to the collaboration engine 80*c*, thereupon to the server 78*c*, thereupon to the server repository 72*c*, and thereupon to the server data storage area 74*c* to provide stripe data Bb 98 that is a second partial copy of the primary data B 88. The stripe data Ba 84 in combination with the stripe data Bb 98 provide a complete copy of the primary data B 88.

The data storage 74*b* can also include stripe data Ca 92. The stripe data Ca 92 corresponds to the server 78*c*. It should understood that the stripe data Ca 92 is provided as a first partial copy of primary data C 94, further described below.

The data storage area 74*c* includes primary data C 94. The primary data C 94 is generated and provided in association with the server applications 76*c*. As described above with regard to primary data A 82, the primary data C 94 can correspond to more than one client computer coupled to the server 78*c*. A first portion of the primary data C 94 within the server repository 72*c* is provided to the server 78*c*, thereupon to the collaboration engine 80*c*, thereupon to the collaboration engine 80*b*, thereupon to the server 78*b*, thereupon to the server repository 72*b*, and thereupon to the server data storage area 74*b* to provide the stripe data Ca 92 that is the first partial copy of the primary data C 94. A second portion of the primary data C 94 within the server repository 72c is also provided to the server 78c, thereupon to the collaboration engine 80c, thereupon to the collaboration engine 80a, thereupon to the server 78a, thereupon to the server repository 72a, and thereupon to the server data storage area 74a to provide the stripe data Cb 86 that is the second partial copy of the primary data C 94. The stripe data Ca 92 in combination with the stripe data Cb 86 provides a complete copy of the primary data C 94.

While primary data A 82, primary data B 88, and primary data C 94 are shown and described to be associated with the respective stripe data Aa 90 and stripe data Ab 96, stripe data Ba 84 and stripe data Bb 98, and stripe data Ca 92 and stripe data Cb 86, it should be recognized that any number of stripe data copies can be generated with this invention. Furthermore, each stripe data copy can correspond to any proportion of corresponding primary data. In one embodiment, each of stripe data correspond to one half of the associated primary data. For example, stripe data Aa 90 and stripe data Ab 96 can correspond to one half of the primary data A 82. In another embodiment, stripe data copies each correspond to one third of the primary data, each provided to one of three server data storage areas (not shown).

It should be recognized that the collaboration engines 80a–80c can create the stripe data in real time as the corresponding primary data, for example primary data A 82, primary data B 88, and primary data C 94 are changed by the variety of clients (not shown) that are coupled to the servers 78a–78c. Thus the stripe data taken in combination corresponds to a complete copy of all data in real time.

Each of the collaboration engines 80a–80c allows the respective server 78a–78c to share information corresponding to its respective server repository 72a–72c, including information corresponding to its respective server storage data storage area 74a–74c and to its respective server application 76a–76c. For example, the servers 78a–78c can each access the primary data A 82, the primary data B 88, and the primary data C 94, and each of the servers 78a–78c can access the stripe data Ba 84, the stripe data Cb 86, the stripe data Aa 90, the stripe data Ca 92, the stripe data Ab 96, and the stripe data Bb 98, and each of the servers 78a–78c can access each of the server applications 76a–76c. In further discussion below, it will be assumed that each of the servers 78a–78c are provided having the respective integral collaboration engine 80a–80c.

With this particular arrangement, all servers have access to particular data. For example, servers 78a–78c have access to primary data A 82, servers 78a–78c have access to stripe data Aa 90, and servers 78a–78c have access to stripe data Ab 96. Here, if any one of the servers loses communication, malfunctions, or otherwise becomes damaged, all data corresponding to the primary data A 82 can be accessed by a server. For example, if the server 102a malfunctions, resulting in the loss of the server repository 72a having primary data A 82, then another server, for example the server 78b can recover the data by combining the stripe data Aa 90 with the stripe data Ab 96.

Upon damage to a primary data, corresponding stripe data can be merged to generate a new primary data. For example, if the primary data A 82 is lost due to malfunction, loss of collaboration coupling, or the like, the stripe data Aa 90 and the stripe data Ab 96 can be merged to generate a new primary data A (not shown). The collaborations engines 80a–80c keep track of the new primary data A and direct the clients accordingly to the new primary data A as if it were the primary data A 82.

As described above, client computers can depend upon the respective server to which they are coupled for some processing functions. Essentially, functions that would otherwise be performed by the client computers (not shown) and the client computer repositories (not shown) can be re-allocated to the respective servers 78a–78c and the respective server repositories 72a–72c. The collaboration engine, for example collaboration engine 80a, can receive information from the clients (not shown) to which it is coupled, for example, information about the type of processing platform, and can also receive information from the server 78a about the server loading, i.e. the amount of processing, ongoing within the server 78a. With this information, the collaboration engine, for example, collaboration engine 80a, can generate an allocation of processing load between the clients (not shown) coupled to the server 78a and the server 78a.

Thus, the collaboration engines 80a–80c can provide at least two functions. The collaboration engines 80a–80c can generate stripe data Aa and stripe data Ab to server data storage areas 74a–74c and they can allocate processing between clients (not shown) and the servers 78a–78c. As mentioned above, both of these functions correspond to the performance reliability improvement (PRIM) for reasons to be further explained below.

Figure 4:
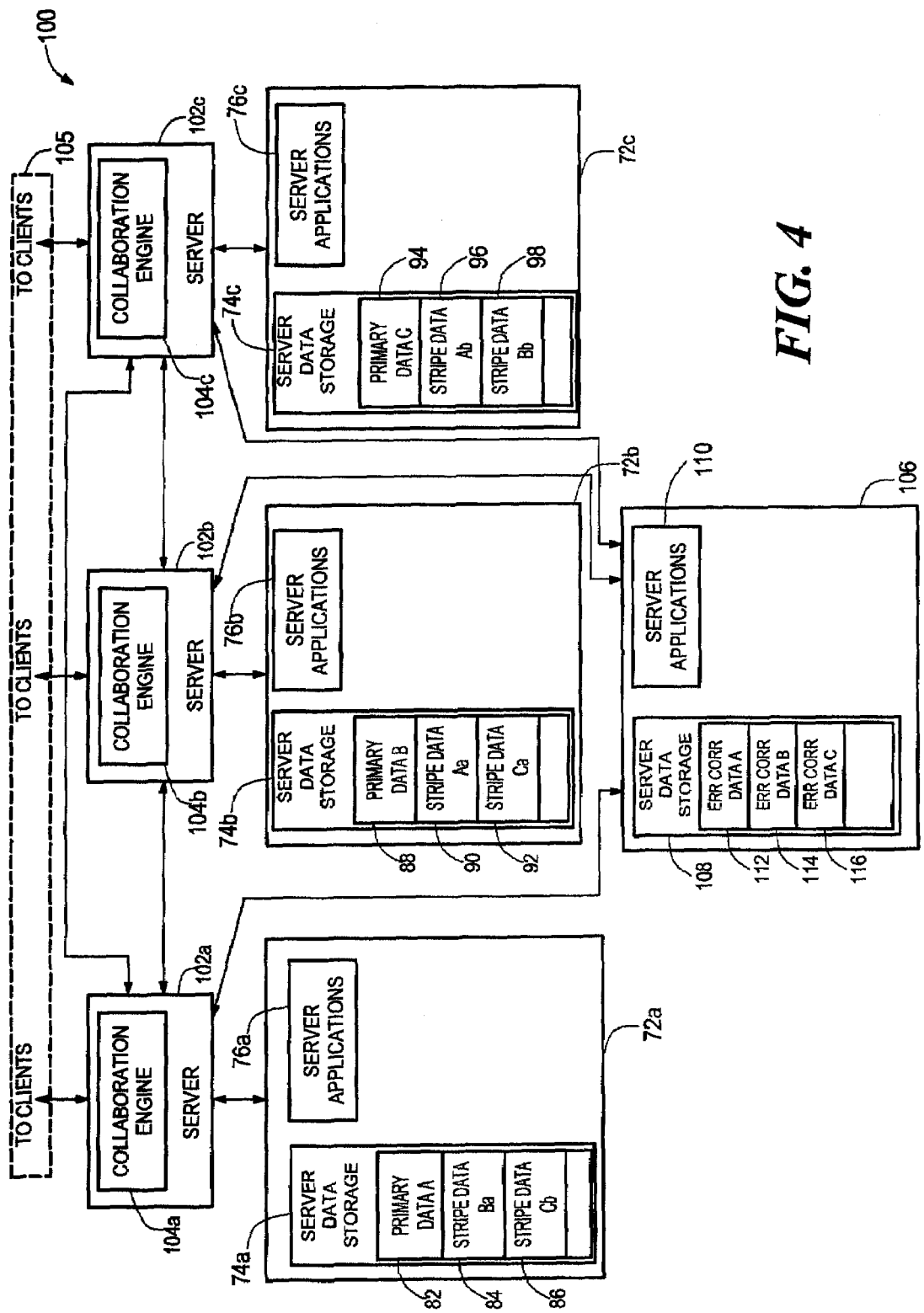
FIG. 4 is a block diagram showing further detail of FIG. 1, showing yet another illustrative embodiment of PRIM in accordance with this invention.

Referring now to FIG. 4, in which like elements of FIG. 3 are shown having like reference designations, another illustrative example of a multi-server collaborative client-server system 100 includes a plurality of server repositories, here server repositories 72a, 72b, 72c, 106. Each of the server repositories 72a, 72b, 72c, 106 includes a respective server data storage area 74a, 74b, 74c, 108, and a respective server application 76a, 76b, 76c, 110. Each of the server repositories 72a, 72b, 72c are coupled to respective servers 102a–102c, each containing a respective collaboration engine 104a–104c. A server repository 106 is coupled to each of the servers 102a–102c. The servers 102a–102c can be provided as the type of servers 18a–18c shown in FIG. 1. The server repositories 72a, 72b, 72c, 106 can be provided as the type of server repositories 12a–12c shown in FIG. 1. The server data storage areas 74a–74c, 108 can be provided as the type of server repositories 14a–14c shown in FIG. 1. Here, however, the server data storage areas 74a–74c, 108 are again shown in greater detail. The server applications 76a–76c, 110 can also be provided as the type of server applications 16a–16b shown in FIG. 1.

Again, as described above, though collaboration, the servers 102a–102c communicate the respective server data storage areas 74a–74c, 108 and the respective server applications 76a–76c, 110 to others of the servers 78a–78c. Thus, a client computer (not shown) can communicate with one or more of the server data storage areas 74a–74c, 108 and one or more of the server applications 76a–76c, 110, wherein the one or more server data storage areas 74a–74c, 108 and the one or more server applications 76a–76c, 110 are associated with a collaboration session. The collaboration is indicated by a phantom border 105.

The server data storage areas 74a–74c include both primary data and stripe data as described above in association with FIG. 3. The server repository 106 is provided having error correction data A 112, error correction data B 114, and error correction data C 116 associated with primary data A 82, primary data B 88, and primary data C 94 respectively. The error correction data A 112, error correction data B 114, and error correction data C 116 are generated by collaboration engines 104a–104c to provide information that can be used to re-generate primary data A 82, primary data B 88, and/or primary data C 94 from corresponding stripe data if any one or more of the respective corresponding stripe data Aa 90, stripe data Ab 96, stripe data Ba 84, stripe data Bb 98, stripe data Ca 92, stripe data Cb 86 of the corresponding stripe data are lost. Such data loss can be associated with a damaged communication link, with a damaged server 102a–102c, or with a damaged server repository 72a–72c.

It should be recognized that the collaboration engines 104a–104c can create the stripe data and the error correction data in real time as the corresponding primary data, for example primary data A 82, primary data B 88, and primary data C 94 are changed by the variety of clients (not shown) that are coupled to the respective servers 102a–102c.

Each of the collaboration engines 104a–104c allows the respective server 102a–102c to share information corresponding to its respective server repository 72a–72c, including information corresponding to its respective server storage data storage area 74a–74c and to its respective server application 76a–76c. For example, the servers 102a–102c can each access the primary data A 82, the primary data B 88 and the primary data C 94, and each of the servers 102a–102c can access the stripe data Ba 84, the stripe data Cb 86, the stripe data Aa 90, the stripe data Ca 92, the stripe data 96, and the stripe data Bb 98, and each of the servers 102a–102c can access each of the server applications 76a–76c. Each of the servers 102a–102c can also access the error correcting data A 112, the error correcting data B 114, and the error correcting data C 116. In further discussion below, it will be assumed that each of the servers 102a–102c are provided having the respective integral collaboration engine 104a–104c.

With this particular arrangement, all servers have access to particular data. For example, servers 102a–102c have access to primary data A 82, server 102a–102c have access to stripe data Aa 90, and servers 102a–102c have access to stripe data Ab 96. Here, if any two of the servers loses communication, malfunction, or otherwise become damaged, all data corresponding to the primary data A 82 can be accessed by another server. For example, if the server 102a malfunctions, resulting in loss of the server repository 72a having the primary data A 82, and the server 102b malfunctions resulting in loss of the server repository 72b having the stripe data Aa 90, then the server 102c can recover data corresponding to the primary data A 82 by combining the stripe data Ab 96 with the error correcting data A 112.

Thus, the collaboration engines 104a–104c can provide at least three functions. The collaboration engines 104a–104c can generate stripe data to server data storage areas 74a–74c as described above, collaboration engines 104a–104c can allocate processing between clients (not shown) and respectively servers 102a–102c as described above, and collaboration engines 104a–104c can generate error correction data A 112, error correction data B 114, and error correction data C 116. All of these functions correspond to the performance reliability improvement (PRIM) for reasons to be further explained below.

Figure 5:
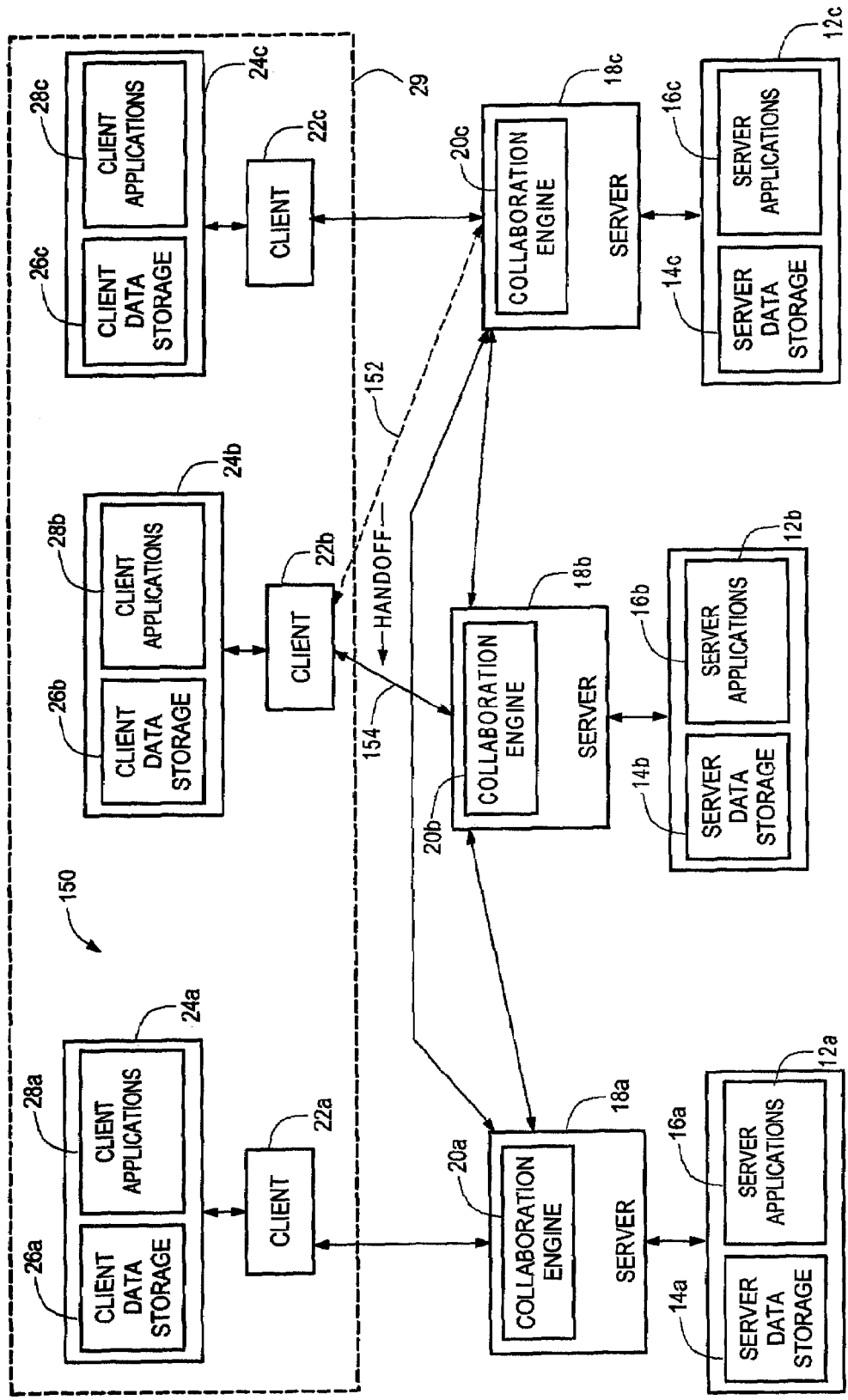
FIG. 5 is a block diagram of an illustrative embodiment of a collaborative client-server system having service handoff.

Referring now to FIG. 5, in which like elements of FIG. 1 are shown having like reference designations, yet another illustrative example of a multi-server collaborative client-server system 150 includes the server repositories, here server repositories 12a–12c, each of which are coupled to a respective server 18a–18c. Each of the servers 18a–18c includes a respective collaboration engine 20a–20c. The servers 18a–18c can be provided as the type of servers 18a–18c shown in FIG. 1. The server repositories 12a–12c can be provided as the type of server repositories 12a–12c shown in FIG. 1. The collaboration engines 20a–20c can be provided as the type of server repositories 20a–20c shown in FIG. 1.

A coupling, or communication link, 152 couples the client 22b to the server 18c. As described above, a server, for example the servers 18a–18c, can each have zero or more clients coupled to the server. Here, server 18b initially has no coupled clients and server 18c initially has two coupled clients 22b, 22c. If and when the collaboration engine 18c determines that the server 18c is too congested, the coupling can be handed off such that client 22b breaks the communication link 152 to server 18c and establishes a communication link 154 with server 18b. The determination of server congestion can be made in a variety of ways, including but not limited to a determination that too many clients are coupled to server 18c, a determination that the clients coupled to server 18c require too much data to pass along the variety of client to server 18c couplings, a determination that the server 18c is performing too much processing, and/or a determination that one or more of the couplings from the collaboration engine 20c to others of the collaboration engines 20a–20b provides an insufficiently slow data path. Upon a determination of server congestion, the client coupling, for example the client communication link 152 to the server 18c, can be handed off to other servers, for example to server 18b with a communication link 154. Thus, the coupling can switch from the communication link 152 to the communication link 154. It should be further recognized that a server, for example the server 18c, can handoff more than one client coupling to more than one other server.

It should also be recognized that the handoff from the communication link 152 to the communication link 154 can also be provided upon a total loss of the communication link 152. The total loss can result from a variety of causes, including, but not limited to, a malfunction of the server 18c, and a malfunction of the server repository 12c.

It will be recognized that the client to server coupling must be handed off seamlessly, i.e., without loss of data. From the discussion associated with FIGS. 2–4 above, it can be understood that data associated with a client, for example the client 22b, can reside either in total or in part in the server data storage areas 14a–14c associated with all of the servers 18a–18c. In addition, all of the servers 18a–18c can have knowledge of the existence of the other servers 18a–18c by way of the collaboration engines 20a–20c, as well as knowledge of the types of computing platforms of each of the client computers 22a–22c.

It should be understood that the communication links 152, 154 can be provided as a variety of couplings, including wire couplings and RF couplings. It should be recognized that, where the communication links 152, 154 are provided as RF communication links, the handoff from the communication link 152 to the communication link 154 can be necessitated also by a loss of RF signal strength or signal integrity, hereafter referred to in combination as signal integrity, associated with the communication link 154. Such loss of signal integrity can occur, for example, if the client 22b is mobile and moving, and/or if the server 18c is mobile and moving. When the client 22b becomes too far from server 18c, then a loss of RF signal integrity will result. The loss of RF signal integrity can occur in a variety of other ways. For example, it will be recognized by one of ordinary skill in the art that the RF propagation behavior of RF pathways is partly based upon air temperature layers, solar activity and the like. Thus, even for stationary clients and servers, the RF propagation path may lose signal integrity from time to time, and a handoff, for example from the communication link 152 to the communication link 154 may be desirable.

Figure 6:
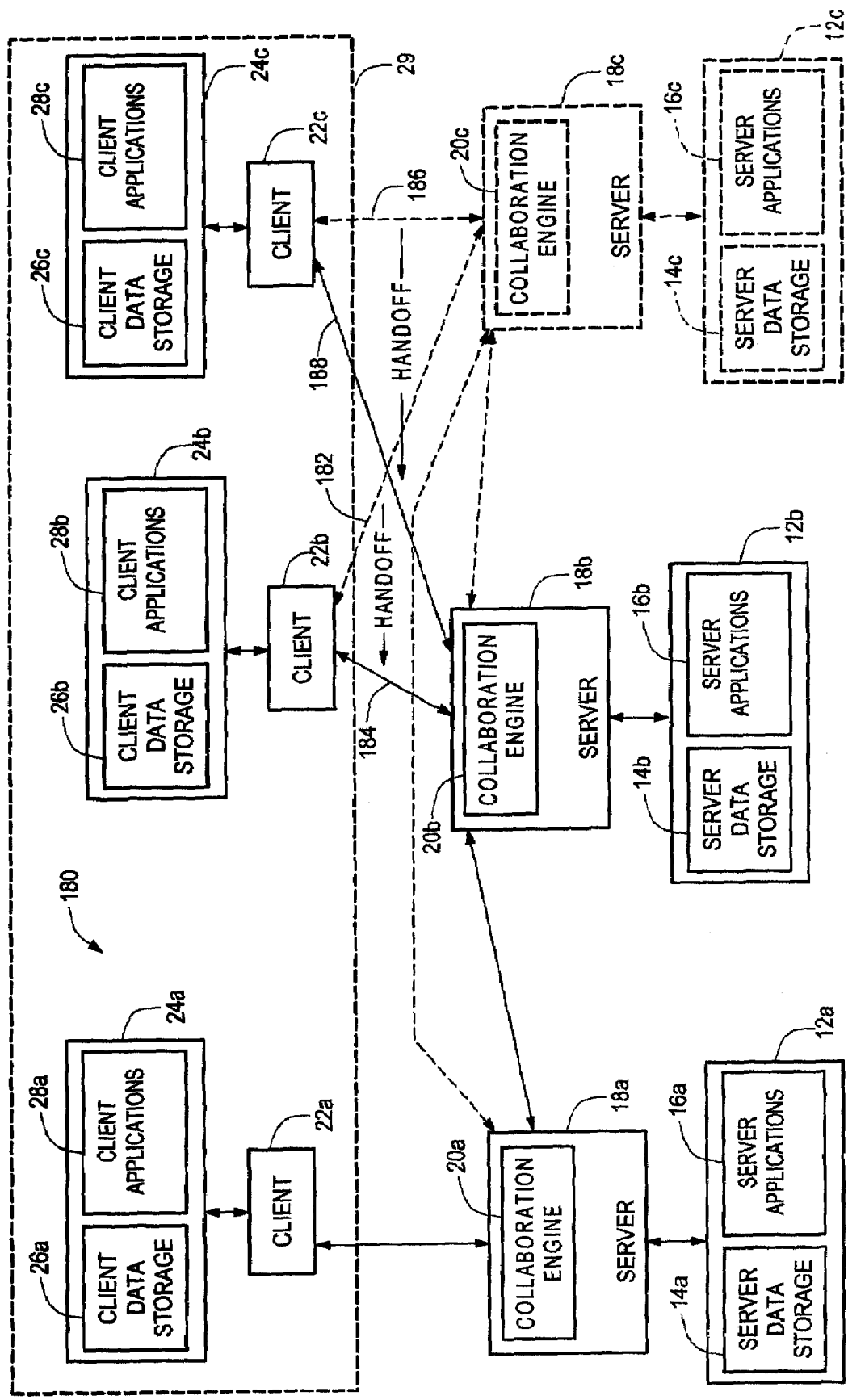
FIG. 6 is a block diagram of another illustrative embodiment of a collaborative client-server system having service handoff.

Referring now to FIG. 6, in which like elements of FIG. 1 are again shown having like reference designations, yet another illustrative example of a multi-server collaborative client-server system 180 includes server repositories, here server repositories 12a–12c, each of which are coupled to a respective server 18a–18c. Each of the servers 18a–18c contain a respective collaboration engine 20a–20c. The servers 18a–18c can be provided as the type of servers 18a–18c shown in FIG. 1. The server repositories 12a–12c can be provided as the type of server repositories 12a–12c shown in FIG. 1.

A communication link 182 couples the client 22b to the server 18c. As described above, a server, for example the servers 18a–18c, can have zero or more clients coupled to the server. Here, server 18b initially has no coupled clients and server 18c initially has two coupled clients 22b, 22c. If and when the collaboration engine 20c determines that the server 18c is too congested, the coupling can be handed off such that client 22b breaks the communication link 182 to server 18c and establishes a communication link 184 with server 18b. The determination of server congestion can be made in a variety of ways as described above in association with FIG. 5.

Here, the server 18c and the server repository 12c are shown in phantom to indicate that the server 18c has become damaged or is otherwise not in communication with the client-server system 180. In this case, the server 18c can handoff all of its coupled clients, here the clients 22b and 22c, to another server, here server 18b. Thus, the communication link 182 is handed off to the communication link 184 and the communication link 186 is handed off to the communication link 188.

As described above, it will be recognized that the couplings, or communication links, must be handed off seamlessly, without loss of data. From the discussion associated with FIGS. 2–4 above, it can be understood that data associated with a clients 22b and 22c that initially resides in the server data storage area 14c can reside either in total or in part in other server data storage areas 14a–14c associated with respective servers 18a–18c. In addition, all of the servers 18a–18c can have knowledge of the existence of the other servers 18a–18c by way of the collaboration engines 20a–20c, as well as knowledge of the types of computing platforms of each of the client computers 22a–22c.

It should be recognized that, where the communication links 182, 186 are provided as RF communication links, the handoff from the communication link 182 to the communication link 184 and from the communication link 186 to the communication link 188 can be necessitated also by a loss of RF signal integrity. Such loss of signal integrity can occur, for example, if the clients 22b, 22c are mobile and moving, and/or if the servers 18c is mobile and moving. When the clients 22b, 22c become too far from server 18c, then a loss of RF signal integrity will result. The loss of RF signal integrity can also occur in a variety of other ways described above in association with FIG. 5.

Figure 6A:
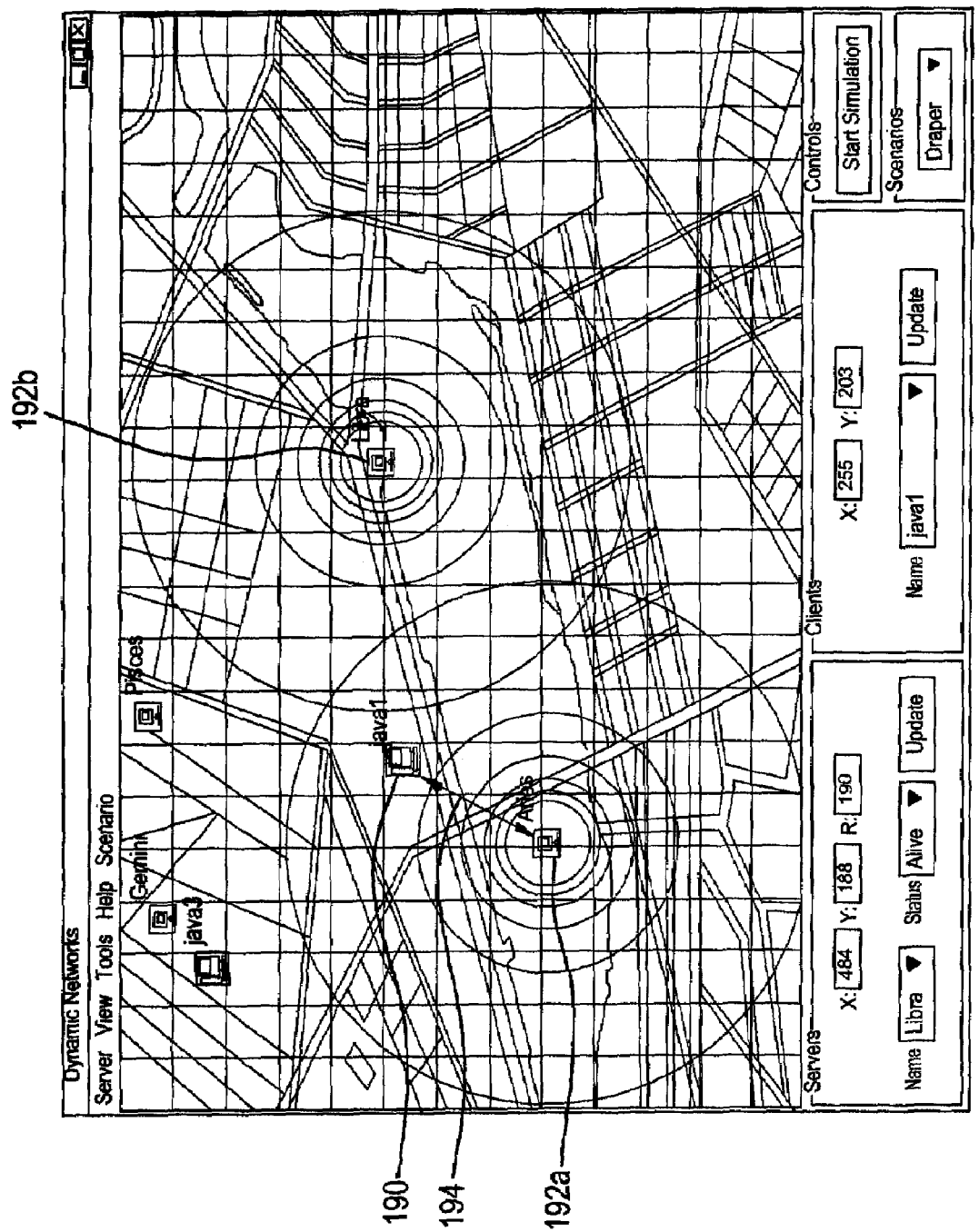
FIG. 6A is a map showing physical locations of client computers and servers.

Referring now to FIG. 6A, a client computer 190 is physically located near a first server 192a and a second server 192b. The client computer 190 will be understood to be one of a variety of computing platforms, for example a laptop, or a PDA. A first RF communication link 194 is established from the client computer 190 to the first server 192a based upon a variety of criteria described above.

Figure 6B:
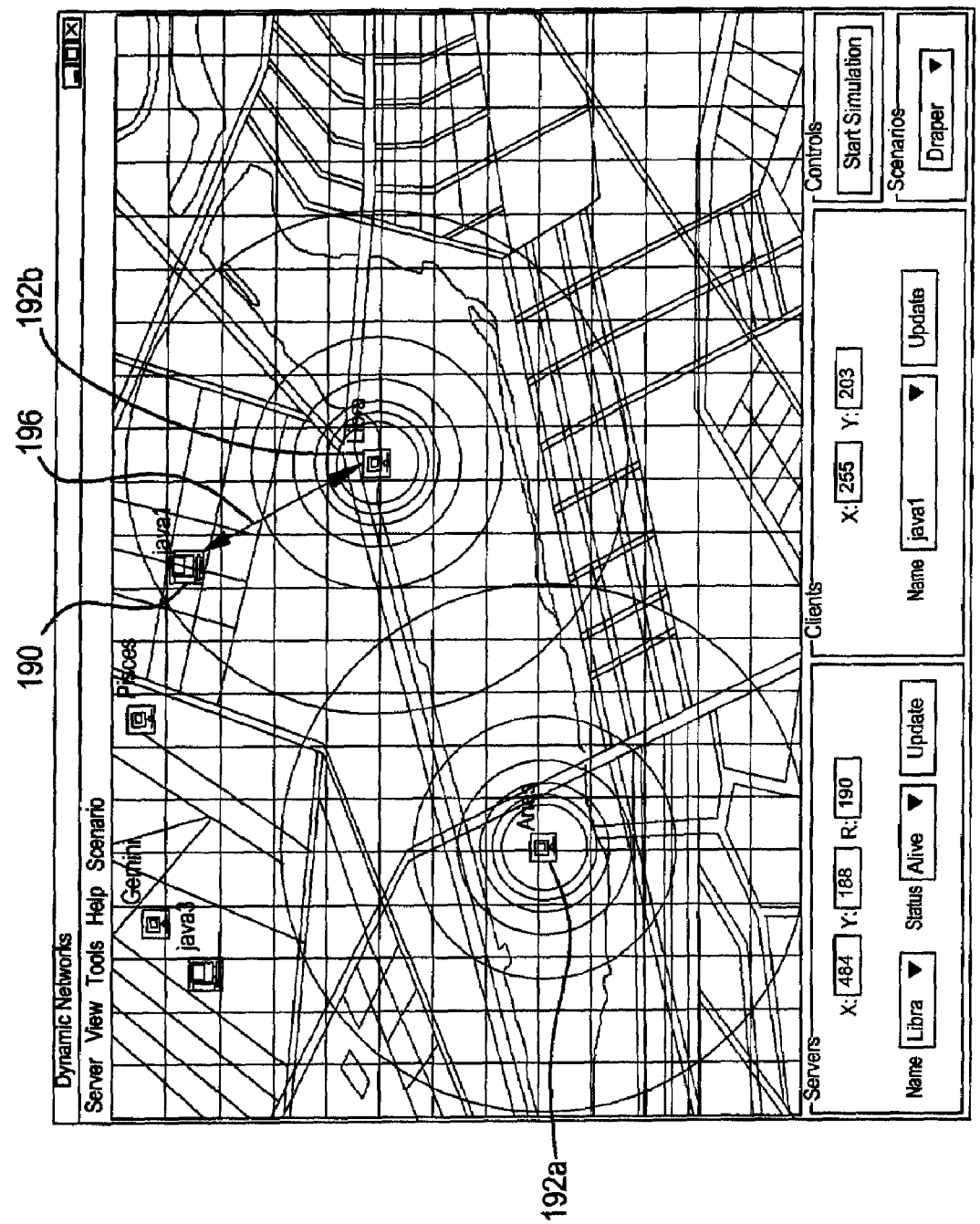
FIG. 6B is a map showing the client computers and the servers of FIG. 6A, in which a client computer has moved.

Referring now to FIG. 6B, in which like elements of FIG. 6A are provided having like reference designations, the client computer 190 has moved to a new physical location. The first RF communication link 194 has been handed off to a second RF communication link 196 associated with the second server 192b, based upon the variety of criteria.

While the client computer 190 is shown to be mobile, it should be understood that the any of the servers 192a–192d can also be mobile.

Figure 7:
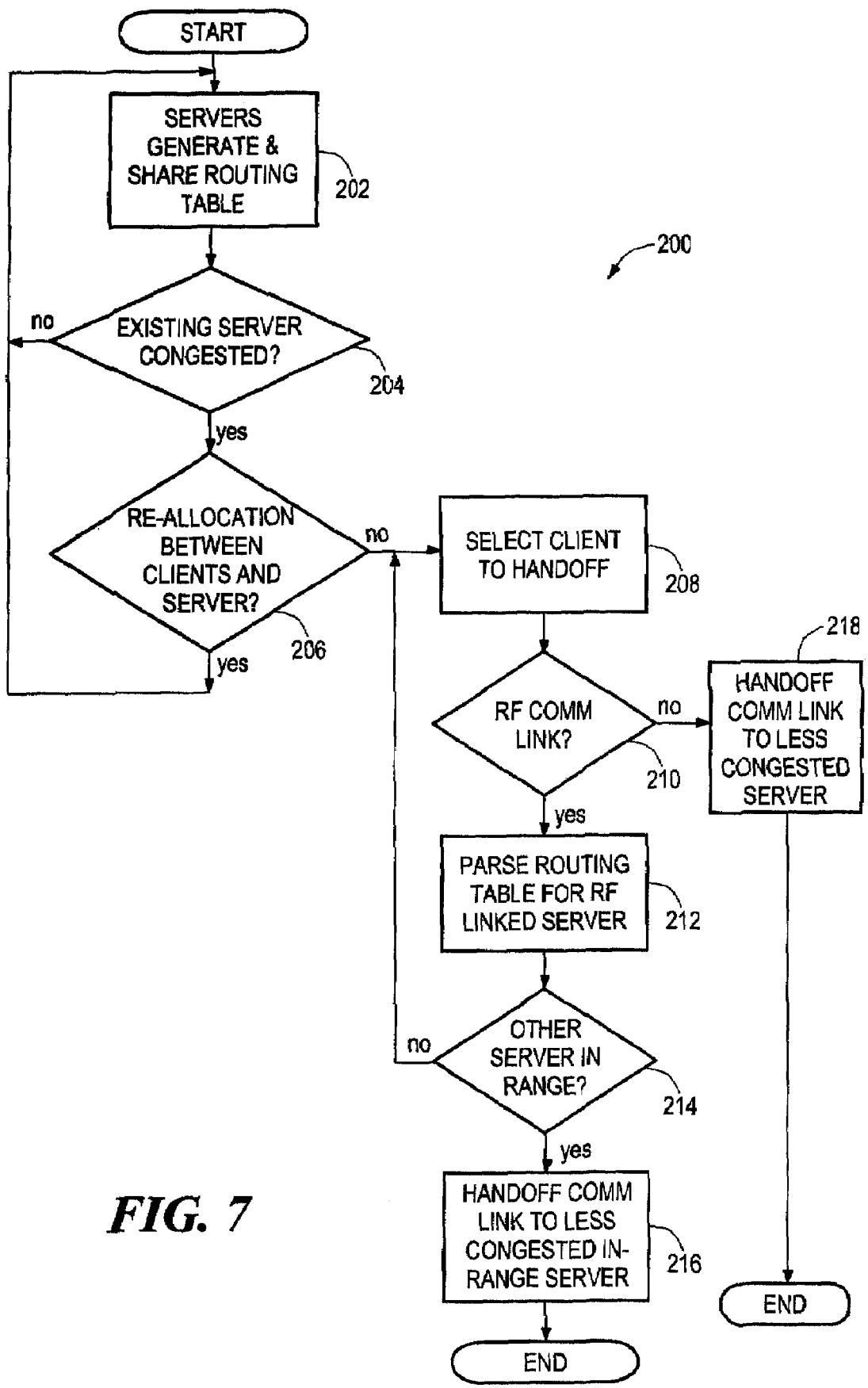
FIG. 7 is a flow chart showing the process of service handoff of a collaborative client-server system.

Referring now to FIG. 7, an illustrative example 200 of a method by which a communication link from a client to an initial server is handed off to another server begins at step 202 in which two or more servers generate and share, via respective collaboration engines, for example collaboration engines 20a–20c of FIG. 1, a "routing table" with congestion values that describe the congestion of each server, for example servers 18a–18c of FIG. 1. The routing table includes the congestion values that describe the congestion of the communication links between one or more client computers and the servers to which the one or more client computers are coupled. The routing table can also include signal integrity values that describe the signal integrity of the communication links between one or more client computers and the servers to which the one or more client computers are coupled. The routing table can also include allocation values that describe client-server processing allocation, as described above, associated with each of the one or more client computers. The routing table can also include client computer identification values that describes the type of each of the one or more client computers. The routing table can also include server identification values that describe the servers. The routing table can further include geographical position values associated with each of the one or more client computers and each of the servers.

An exemplary routing table generated and shared among servers (e.g., the servers 18a–18c of FIG. 5) via respective collaboration engines (e.g., the collaboration engines 20a–20c of FIG. 5) is shown in Table 1 below.

TABLE 1

Exemplary Routing Table

| Client Computers | | | Servers | | | Content | | | | |
| --- | --- | --- | --- | --- | --- | --- | --- | --- | --- | --- |
| Client IP | Client Type | Client Position | Server IP | Server Type | Server Position | Comm Link | RF Strength | Congestion Value | Allocation Value | Signal Integrity |
| 18.58.0.1 | PDA | 50,50 | 18.58.0.134 | Desktop | 50,100 | RF | 60 | 0.4 | 0.3 | 0.8 |
| 18.58.0.2 | Phone | 80,120 | 18.58.0.136 | PDA | 100,100 | RF | 40 | 0.3 | 0.2 | 0.6 |
| ... | ... | ... | ... | ... | ... | ... | ... | ... | ... | ... |
| 18.58.0.10 | Desktop | 60,80 | 18.58.0.134 | Desktop | 50,100 | Wire | n/a | 0.4 | 0.4 | n/a |

In this particular embodiment, parameters indicated by the table headings are defined as follows:

Client IP: A respective client destination IP address associated with each of the one or more client computers, (e.g. the one or more client computers 22a–22c of FIG. 5).

Client Type: A respective client computer identification value that describes the type of each of the one or more client computers. Each of the one or more client computers will be understood to be one of a variety of computing platforms, for example a laptop, or a PDA, each having a specific operating system.

Client Position: A respective set of geographical position values associated with each of the one or more client computers. Server IP: A respective IP address associated with each server, (e.g., the servers 18a–18c of FIG. 5), each server with which the one or more client computers communicate in a collaboration session.

Server Type: A respective server computer identification value that describes the type of each server. Each server will be understood to be one of a variety of computing platforms, for example a desktop, or a PDA, each having a specific operating system. Like each of the one or more client computers, each server can also be mobile and moving.

Server Position: A respective set of geographical position values associated with each server computer.

Comm Link: A respective type of communication link that couples each of the one or more client computers to the server. There are a variety of communication links, including wire communication links and RF communication links.

RF Strength: A respective RF field strength value associated with each of the one or more client computers having an RF communication link. The RF field strength can be provided, for example, by RF field strength electronics coupled to the collaboration engines (e.g. collaboration engines 20a–20c of FIG. 5).

Congestion Value: A respective congestion value associated with each server, the congestion value describing the congestion of the communication links between each of the one or more client computers and the respective servers to which the one or more client computers are coupled.

Allocation Value: A respective allocation value that describes the client-server processing allocation, as described above, associated with each of the one or more client computers.

Signal Integrity: A respective signal integrity value that describes the signal integrity of the communication link between each of the one or more client computers and the server to which the one or more client computers is coupled.

In one embodiment, the routing table can be static, having values pre-assigned. In another embodiment, the routing table is distributed amongst the servers, for example, the servers 20a–20c of FIG. 5, and the routing table in dynamically updated in real time in accordance with the availability and accessibility of the servers to the collaboration session.

Having the routing table, at step 204, a server determines whether it is congested. If the server is not congested, then the server updates its routing table at a pre-determined time interval and returns to step 202. If the server determines that is congested, it goes to step 206. At step 206, if the server is congested either in total or with regard to any respective one of the one or more client computers, the collaboration engine associated with the server can attempt to re-allocate the processing between the server and any respective ones of the one or more client computers. If the re-allocation is generated, the processing begins again at step 202, at which a new routing table is generated. If the re-allocation is not generated, for example if the collaboration engine determines that re-allocation will not alleviate the congestion, the process continues at step 208. At step 208, a client is selected by the collaboration engine from among the one or more clients that are coupled to the server as listed in the routing table. The selection is determined by a variety of factors, including but not limited to, the amount of congestion represented by each respective one of the one or more clients and the type of communication link from each respective one of the one or more clients to the server. Additional determination factors are described above in association with the routing table.

Having selected a respective client for handoff to another server, at step 210 the collaboration engine determines from the routing table whether the communication link between the respective client and the server is an RF communication link. At step 210, if the communication link of the selected client computer is not an RF communication link, then handoff is done at step 218 as a land link handoff. Further details of the land link handoff are shown described below in association with FIG. 8. If the communication link is an RF communication link, at step 212 the collaboration engine parses the routing table to find RF linked servers having an RF communication link.

At step 214, the collaboration engine examines the entries in the routing table for the RP linked servers and determines which RF linked servers are within an RF range of the selected client computer. The determination of which RF linked servers are within RF range of the selected client computer can be made in a variety of ways. In one exemplary embodiment, the routing table can further include geographical position values associated with each of the one or more client computers and each of the servers. In another exemplary embodiment the routing table can include an RF field strength value associated with each of the client computers having an RF communication link. The RF field strength can be provided, for example, by RF field strength electronics (not shown) coupled to the collaboration engine. The determination of which RF linked servers are within RF range of the selected client can include, but is not limited to, limits placed upon the geographical position values and/or limits placed upon the RF field strength values.

At step 214, if a selected RF linked server is found to be in range of the selected client, the communication link from the selected client can be handed off to the selected RF linked server. Further details of the RF link handoff are shown described below in association with FIG. 8. It should be recognized that for the handoff to occur seamlessly, it is desirable that the communication link to the selected server be established before the communication link to the initial server is broken.

In an alternative embodiment, the selected client can be coupled with communication links to both the initial server and to the selected server at all times. With this arrangement, the initial server can be the primary server that receives information, until the handoff occurs to the selected server, at which time the selected server becomes the primary server.

Figure 8:
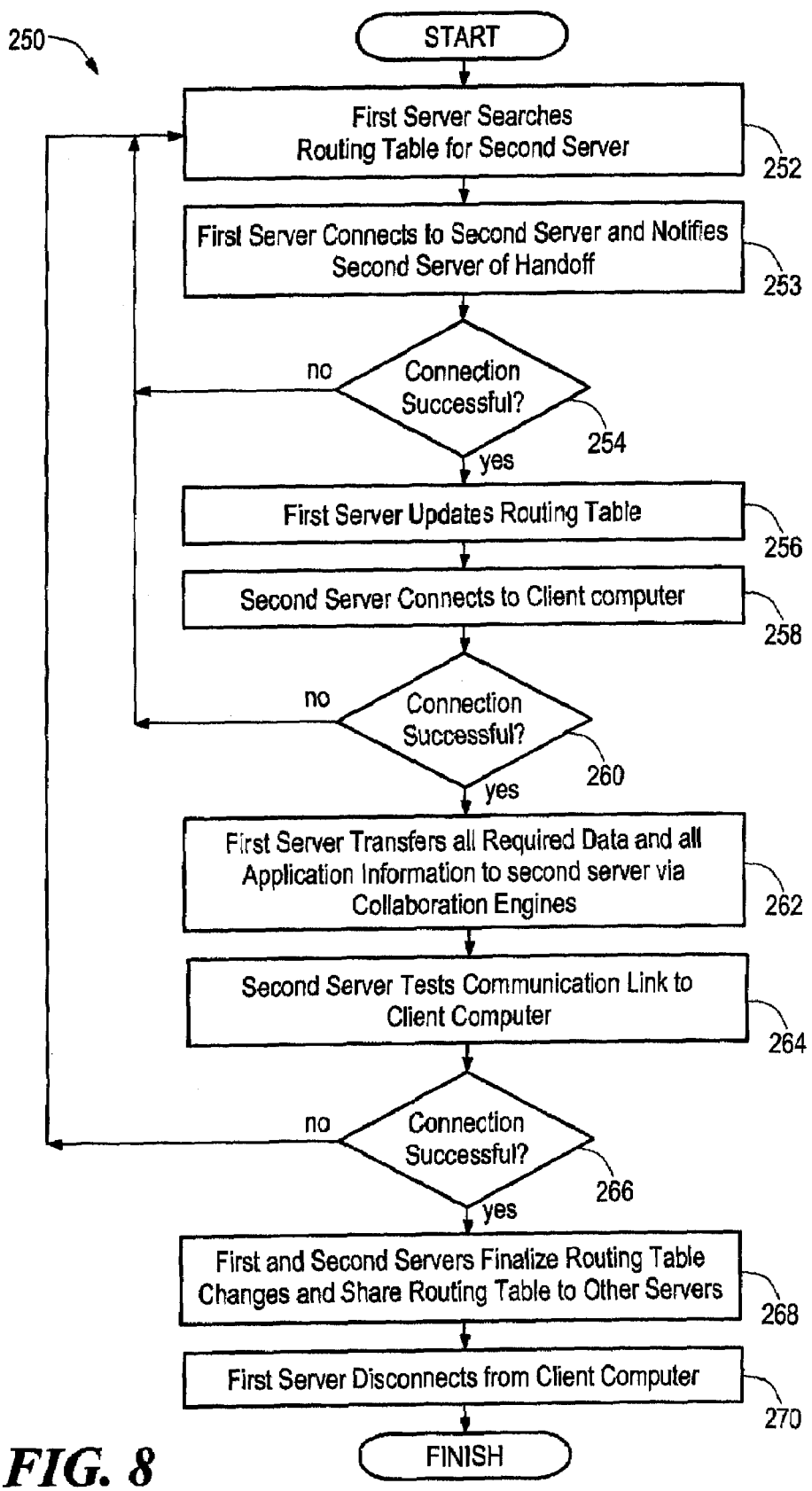
FIG. 8 is a flow chart showing further details of the service handoff of FIG. 7.

Referring now to FIG. 8, a service handoff process 250 can correspond to both the land link handoff (e.g., step 218 of FIG. 7) and the RF link handoff (e.g., steps 212–216 of FIG. 7). The land link handoff and the RF link handoff are described together below. Where distinctions between the RF link handoff and the land link handoff are necessary, the distinctions are expressly described.

At step 252, a first server (e.g. server 18c of FIG. 5) to which a client computer (e.g., client computer 22b of FIG. 5) is coupled with a communication link (e.g., communication link 152 of FIG. 5), searches the routing table for a second server (e.g., server 18b of FIG. 5) to which the client computer may be handed off. Where the handoff is a land link handoff, the selection of the second server is determined by a variety of factors, including, but not limited to, the land communication link type, the server geographic position, the server congestion values, and the server allocation values. Where the handoff is an RF link handoff, the selection of the second server is also determined by a variety of factors, including, but not limited to, the RF communication link type, the server geographic position, the RF field strength, the server congestion values, the server allocation values, and a range between the client computer and the second server.

At step 254, if the connection from the first to the second server is successful, the process proceeds to step 256. Otherwise, the process returns to step 252. At step 256, the first server updates the routing table to indicate the new coupling that will occur between the second server and the client computer. At step 258, where the handoff is an RF handoff, the second server connects to the client computer with an RF communication link (e.g., communication link 154 of FIG. 5). At step 258, where the handoff is a land link handoff, the second server connects to the client computer with a land communication link (e.g., communication link 154 of FIG. 5).

At step 260, if the connection is successful, the process proceeds to step 262. Otherwise the process returns to step 252. At step 262, the first server transfers to the second server, via the collaboration engines (e.g. collaboration engines 20*b*, 20*c* of FIG. 5), all of the required data and all of the required applications information relevant to the client computer. At step 262, the first server also reallocates the client services to the second server. At step 264, the second server tests the new communication link to the client computer. Where the communication link is a land communication link, the testing includes, but is not limited to, the congestion value associated with the second server now having the communication to the client computer. Where the communication link is an RF communication link, the testing includes, but is not limited to, the RF field strength, the signal integrity, and the congestion value associated with the second server now having the communication link to the client computer.

At step 266, if the above testing is successful, the process proceeds to step 268. Otherwise, the process returns to step 252. At step 268, the first and second servers finalize the changes to the routing table and communicate the new routing table to other servers (e.g., server 18*a* of FIG. 5) via respective collaboration engines (e.g., collaboration engines 20*a*–20*c* of FIG. 5). At step 270 the first server disconnects from the client computer. The handoff from the first to the second server is now complete.

Having described preferred embodiments of the invention it will now become apparent to those of ordinary skill in the art that other embodiments incorporating these concepts may be used. Additionally, the software included as part of the invention may be embodied in a computer program product that includes a computer-readable storage medium. For example, such a computer-readable storage medium can include a readable memory device, such as a hard drive device, a CD-ROM, a DVD-ROM, or a computer diskette, having computer readable program code segments stored thereon. A computer transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A collaboration system comprising:
a first collaboration server;
a first collaboration server repository coupled to the first collaboration server, wherein the first collaboration server repository has a first copy of a collaboration application and first collaboration server data associated with the first copy of the collaboration application stored therein;
a first collaboration engine coupled to the first collaboration server;
a second collaboration server, wherein the first and second collaboration servers are adapted to operate in a collaboration session;
a second collaboration server repository coupled to the second collaboration server, wherein the second collaboration server repository has a second copy of the collaboration application, second collaboration server data associated with the second copy of the collaboration application, and a portion of the first collaboration server data stored therein, wherein the portion of the first collaboration server data is automatically updated in real time to reflect changes in the first collaboration server data; and
a second collaboration engine coupled to the second collaboration server and coupled to the first collaboration engine, wherein the first collaboration engine is adapted to transfer first collaboration application information associated with operation of the first copy of the collaboration application to the second collaboration engine and the second collaboration engine is adapted to transfer second collaboration application information associated with operation of the second copy of the collaboration application to the first collaboration engine.

2. The collaboration system of claim 1, wherein the portion of the first collaboration server data includes a complete copy of the first collaboration server data.

3. The collaboration system of claim 1, wherein the portion of the first collaboration server data includes a first partial copy of the first collaboration server data.

4. The collaboration system of claim 3, further comprising:
a third collaboration server coupled to at least one of the first and the second collaboration servers;
a third collaboration server repository coupled to the third collaboration server, wherein the third collaboration server repository has third collaboration server data and a second partial copy of the first collaboration server data stored therein; and
a third collaboration engine coupled to the third collaboration server and coupled to the first and second collaboration engines.

5. The collaboration system of claim 4, wherein the first and the second partial copies of the first collaboration server data can be accessed by the second and the third collaboration engines respectively to provide the first collaboration server data.

6. The collaboration system of claim 4, further comprising:
a fourth collaboration server coupled to at least one of the first, second, and third collaboration servers;
a fourth collaboration server repository coupled to the fourth collaboration server, wherein the fourth collaboration server repository has error correcting data stored therein, wherein the error correcting data is adapted to allow reconstruction of the first collaboration server data from either the first partial copy of the first collaboration server data or the second partial copy of the first collaboration server data; and a fourth collaboration engine coupled to the fourth collaboration server and coupled to the first, second, and third collaboration engines.

7. The collaboration system of claim 1, further comprising:

a client computer coupled with a client coupling to a selected one of the first and second collaboration servers, wherein a selected one of the first and the second collaboration engines is adapted to select the client coupling.

8. The collaboration system of claim 7, wherein the selected one of the first and second collaboration engines is adapted to seamlessly hand off the client coupling between the first and the second collaboration servers during the collaboration session in accordance with data congestion associated with the client coupling.

9. The collaboration system of claim 7, wherein the selected one of the first and second collaboration engines is adapted to seamlessly hand off the client coupling between the first and the second collaboration servers during the collaboration session in accordance with processing congestion associated with the first and the second collaboration servers.

10. The collaboration system of claim 7, wherein the selected one of the first and second collaboration engines is adapted to seamlessly hand off the client coupling between the first and the second collaboration servers during the collaboration session in accordance with a quality of coupling integrity associated with the client coupling.

11. The collaboration system of claim 7, wherein the client coupling is a radio frequency (RF) communication link.

12. The collaboration system of claim 11, wherein the selected one of the first and second collaboration engines is adapted to seamlessly hand off the client coupling between the first and the second collaboration servers during the collaboration session in accordance with RF field strength associated with the RF communication link.

13. The collaboration system of claim 11, wherein the selected one of the first and second collaboration engines is adapted to seamlessly hand off the client coupling between the first and the second collaboration servers during the collaboration session in accordance with geographical positions of the client computer and of the first and second collaboration servers.

14. The collaboration system of claim 1, wherein, if the first collaboration server loses communication with the collaboration session or become inoperative, the collaboration session can continue without loss of the first collaboration server data and without loss of the first collaboration application information, by using the second collaboration server.

15. A collaboration method comprising:

storing first collaboration server data and a first copy of a collaboration application in a first collaboration server storage area associated with a first collaboration server;

storing second collaboration server data, a portion of the first collaboration server data, and a second copy of the collaboration application in a second collaboration server storage area associated with a second collaboration server;

collaborating with the first and second collaboration servers in a collaboration session;

automatically updating the portion of the first collaboration server data in real time to reflect changes in the first collaboration server data;

transferring, via a first collaboration engine, first collaboration application information associated with operation of the first copy of the collaboration application to the second collaboration server; and transferring, via a second collaboration engine, second collaboration application information associated with operation of the second copy of the collaboration application to the first collaboration server, wherein the first collaboration engine is associated with the first collaboration server and the second collaboration engine is associated with the second collaboration server.

16. The collaboration method of claim 15, wherein the portion of the first collaboration server data includes a complete copy of the first collaboration server data.

17. The collaboration method of claim 15, wherein the portion of the first collaboration server data includes a first partial copy of the first collaboration server data.

18. The collaboration method of claim 17, further comprising:

storing third collaboration server data in a third server storage area associated with a third collaboration server, wherein the third collaboration server is coupled to at least one of the first collaboration server and the second collaboration server, wherein the third collaboration server data includes a second partial copy of the first collaboration server data.

19. The collaboration method of claim 18, further comprising:

accessing the first and the second partial copies of the first collaboration server with the second and third collaboration servers respectively to provide the first collaboration server data.

20. The collaboration method of claim 18, further comprising:

storing error correcting data in a fourth collaboration server storage area associated with a fourth collaboration server, wherein the fourth collaboration server is coupled to at least one of the first, second, and third collaboration servers, wherein the error correcting data is adapted to allow reconstruction of the first collaboration server data from either the first partial copy of the first collaboration server data or the second partial copy of the first collaboration server data.

21. The collaboration method of claim 15, further comprising:

selecting a client coupling between a client computer and a selected one of the first and second collaboration servers, wherein a selected one of the first and second collaboration engines is adapted to select the client coupling.

22. The collaboration method of claim 21, further comprising:

seamlessly handing off the client coupling between the first and the second collaboration servers during the collaboration session, wherein the handoff is determined by data congestion associated with the client coupling.

23. The collaboration method of claim 21, further comprising:

seamlessly handing off the client coupling between the first and the second collaboration servers during the collaboration session, wherein the handoff is determined by processing congestion associated with the first and the second collaboration servers.

24. The collaboration method of claim 21, further comprising:
seamlessly handing off the client coupling between the first and the second collaboration servers during the collaboration session, wherein the handoff is determined by a loss of connection integrity associated with the client coupling.

25. The collaboration server of claim 21, wherein the client coupling is a radio frequency (RF) communication link.

26. The collaboration method of claim 25, further comprising:
determining the RF field strength associated with the client coupling; and
seamlessly handing off the client coupling between the first and second collaboration servers during the collaboration session, wherein the handoff is determined by the RF field strength.

27. The collaboration method of claim 25, further comprising:
determining geographic positions of the client computer and the first and second collaboration servers; and
seamlessly handing off the client coupling between the first and the second collaboration servers during the collaboration session, wherein the handoff is determined by the geographic positions.

28. The collaboration method of claim 15, further comprising
continuing the collaboration session without loss of the first collaboration server data and without loss of the first collaboration application information if the first collaboration server loses communication with the collaboration session or become inoperative, by using the second collaboration server.

29. A computer-readable storage medium encoded with computer-readable code, comprising:
instructions for storing first collaboration server data and a first copy of a collaboration application in a first server storage area associated with a first collaboration server;
instructions for storing second collaboration server data, a portion of the first collaboration server data, and a second copy of the collaboration application in a second server storage area associated with a second collaboration server,
instructions for collaborating with the first and second collaboration servers in a collaboration session;
instructions for automatically updating the portion of the first collaboration server data in real time to reflect changes in the first collaboration server data;
instructions for transferring, via a first collaboration engine, first collaboration application information associated with operation of the first copy of the collaboration application to the second collaboration server; and
instructions for transferring, via a second collaboration engine, second collaboration application information associated with operation of the second copy of the collaboration application to the first collaboration server, wherein the first collaboration engine is associated with the first collaboration server and the second collaboration engine is associated with the second collaboration server.

30. The computer-readable storage medium of claim 29, wherein the portion of the first collaboration server data includes a complete copy of the first collaboration server data.

31. The computer-readable storage medium of claim 29, wherein the portion of the first collaboration server data includes a first partial copy of the first collaboration server data.

32. The computer-readable storage medium of claim 31, further comprising:
instructions for storing third collaboration server data in a third server storage area associated with a third collaboration server, wherein the third collaboration server is coupled to at least one of the first collaboration server and the second collaboration server, wherein the third collaboration server data includes a second partial copy of the first collaboration server data.

33. The computer-readable storage medium of claim 32, further comprising:
instructions for accessing the first and the second partial copies of the first collaboration server data with the second and third collaboration servers respectively to provide the first collaboration server data.

34. The computer-readable storage medium of claim 32, further comprising:
instructions for storing error correcting data in a fourth server storage area associated with a fourth collaboration server, wherein the fourth collaboration server is coupled to at least one of the first, second, and third collaboration servers, wherein the error correcting data is adapted to allow reconstruction of the first collaboration server data from either the first partial copy of the first collaboration server data or the second partial copy of the first collaboration server data.

35. The computer-readable storage medium of claim 29, further comprising:
instructions for selecting a client coupling between a client computer and a selected one of the first and second collaboration servers, wherein a selected one of the first and second collaboration engines is adapted to select the client coupling.

36. The computer-readable storage medium of claim 35, further comprising:
instructions for seamlessly handing off the client coupling between the first and the second collaboration servers during the collaboration session, wherein the handoff is determined by data congestion associated with the client coupling.

37. The computer-readable storage medium of claim 35, further comprising:
instructions for seamlessly handing off the client coupling between the first and the second collaboration servers during the collaboration session, wherein the handoff is determined by processing congestion associated with the first and the second collaboration servers.

38. The computer-readable storage medium of claim 35, further comprising:
instructions for seamlessly handing off the client coupling between the first and the second collaboration servers during the collaboration session, wherein the handoff is determined by a loss of connection integrity associated with the client coupling.

39. The collaboration server of claim 35, wherein the client coupling is a radio frequency (RF) communication link.

40. The computer-readable storage medium of claim 39, further comprising:

instructions for determining the RF field strength associated with the client coupling; and instructions for seamlessly handing off the client coupling between the first and second collaboration servers during the collaboration session, wherein the handoff is determined by the RF field strength.

41. The computer-readable storage medium of claim 39, further comprising:

instructions for determining geographic positions of the client computer and the first and second collaboration servers; and instructions for seamlessly handing off the client coupling between the first and the second collaborations servers during the collaboration session, wherein the handoff is determined by the geographic positions.

42. The computer-readable storage medium of claim 29, further comprising:

instructions for continuing the collaboration session without loss of the first collaboration server data and without loss of the first collaboration application information if the first collaboration server loses communication with the collaboration session or become inoperative, by using the second collaboration server.

* * * * *

UNITED STATES PATENT AND TRADEMARK OFFICE
CERTIFICATE OF CORRECTION

PATENT NO. : 7,219,122 B1
APPLICATION NO. : 10/128155
DATED : May 15, 2007
INVENTOR(S) : Pena-Mora et al.

It is certified that error appears in the above-identified patent and that said Letters Patent is hereby corrected as shown below:

Title Page Item (75) Inventors: delete "Gyanesh Dwivedi, Attleboro, CA" and replace with --Gyanesh Dwivedi, San Mateo, CA--.

Column 3, line 14 delete "when then server" and replace with --when the server--.

Column 3, line 24 delete "session," and replace with --sessions,--.

Column 3, line 57 delete "If is a" and replace with --If it is a--.

Column 4, line 32 delete "If is a" and replace with --If it is a--.

Column 5, line 40 delete "provide" and replace with --provided--.

Column 5, lines 42-43 delete "entitled Collaborative Agent Interaction Control and Synchronization System filed" and replace with --entitled "Collaborative Agent Interaction Control and Synchronization System" filed--.

Column 6, lines 58-59 delete "Collaborative Agent Interaction Control and Synchronization System" and replace with --"Collaborative Agent Interaction Control and Synchronization System"--.

Column 7, line 45 delete "though" and replace with --through--.

Column 8, line 13 delete "repository" and replace with --repositories--.

Column 8, line 14 delete "embodiment each" and replace with --embodiment, each--.

Column 8, line 50 delete "though" and replace with --through--.

Column 9, lines 36-37 delete "should understood" and replace with --should be understood--.

Column 10, line 31 delete "application" and replace with --applications--.

Column 11, lines 1-2 delete "entitled Collaborative Agent Interaction Control and Synchronization System filed" and replace with --entitled "Collaborative Agent Interactions Control and Synchronization System" filed--.

Column 11, line 46 delete "though" and replace with --through--.

UNITED STATES PATENT AND TRADEMARK OFFICE
CERTIFICATE OF CORRECTION

| | |
|---|---|
| PATENT NO. | : 7,219,122 B1 |
| APPLICATION NO. | : 10/128155 |
| DATED | : May 15, 2007 |
| INVENTOR(S) | : Pena-Mora et al. |

It is certified that error appears in the above-identified patent and that said Letters Patent is hereby corrected as shown below:

Column 12, line 52-53 delete "should understood" and replace with --should be understood--.

Column 13, line 17 delete "each of stripe data correspond" and replace with --each of the stripe data corresponds--.

Column 13, line 35 delete "application" and replace with --applications--.

Column 14, line 45 delete "though" and replace with --through--.

Column 15, line 17 delete "application" and replace with --applications--.

Column 15, line 66 delete "server repositories" and replace with --collaboration engines--.

Column 17, line 35 delete "with a clients" and replace with --with clients--.

Column 17, line 65 delete "servers 18c" and replace with --server 18c--.

Column 18, line 17 delete "that the any" and replace with --that any--.

Column 19, line 47 delete "in" and replace with --is--.

Column 19, lines 53-54 delete "that is" and replace with --that it is--.

Column 20, line 16 delete ", at step 212 the" and replace with --, at step 212, the--.

Column 20, line 20 delete "RP" and replace with --RF--.

Column 20, line 28 delete "embodiment the" and replace with --embodiment, the--.

Column 21, line 46 delete "At step 270 the" and replace with --At step 270, the--.

Column 21, lines 49-50 delete "invention it" and replace with --invention, it--.

Column 25, lines 30-31 delete "comprising" and replace with --comprising:--.

UNITED STATES PATENT AND TRADEMARK OFFICE
CERTIFICATE OF CORRECTION

PATENT NO. : 7,219,122 B1
APPLICATION NO. : 10/128155
DATED : May 15, 2007
INVENTOR(S) : Pena-Mora et al.

It is certified that error appears in the above-identified patent and that said Letters Patent is hereby corrected as shown below:

Column 25, line 48 delete "server," and replace with --server;--.

Signed and Sealed this

Fifteenth Day of April, 2008

JON W. DUDAS
*Director of the United States Patent and Trademark Office*